United States Patent
Xie et al.

(10) Patent No.: US 9,288,373 B2
(45) Date of Patent: Mar. 15, 2016

(54) SYSTEM AND METHOD FOR HUMAN COMPUTER INTERACTION

(71) Applicant: Tsinghua University, Beijing (CN)

(72) Inventors: Xiang Xie, Beijing (CN); Yi Zheng, Beijing (CN); Guolin Li, Beijing (CN); Wei Song, Beijing (CN); Zhong Lv, Beijing (CN); Lifei Ren, Beijing (CN); Yiqiao Liao, Beijing (CN); Zhihua Wang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 14/511,405

(22) Filed: Oct. 10, 2014

(65) Prior Publication Data

US 2015/0244911 A1   Aug. 27, 2015

(30) Foreign Application Priority Data

Feb. 24, 2014   (CN) .......................... 2014 1 0062551

(51) Int. Cl.
*H04N 5/225* (2006.01)
*G06F 3/01* (2006.01)
*G06T 7/00* (2006.01)

(52) U.S. Cl.
CPC .............. *H04N 5/2258* (2013.01); *G06F 3/017* (2013.01); *G06T 7/0042* (2013.01)

(58) Field of Classification Search
CPC ................. G06F 3/017; G06T 7/0042; G06T 2207/10016; G06T 2207/30196; H04N 5/2258; G06K 9/00201; G06K 9/00375; G06K 9/3233
See application file for complete search history.

(56) References Cited

U.S. PATENT DOCUMENTS

| | | | |
|---|---|---|---|
| 8,228,315 B1* | 7/2012 | Starner et al. | 345/175 |
| 8,723,789 B1* | 5/2014 | Rafii | 345/156 |
| 2001/0035858 A1* | 11/2001 | Blumberg | 345/168 |
| 2004/0246473 A1* | 12/2004 | Hermary et al. | 356/237.1 |
| 2005/0128185 A1* | 6/2005 | Wu et al. | 345/156 |
| 2010/0067181 A1* | 3/2010 | Bair et al. | 361/679.3 |
| 2010/0165116 A1* | 7/2010 | Hsieh et al. | 348/187 |
| 2012/0148145 A1* | 6/2012 | Liu et al. | 382/154 |
| 2012/0212499 A1* | 8/2012 | Haddick et al. | 345/589 |
| 2013/0182902 A1* | 7/2013 | Holz | 382/103 |
| 2015/0102993 A1* | 4/2015 | Gadjali et al. | 345/156 |

* cited by examiner

*Primary Examiner* — Amy Hsu
(74) *Attorney, Agent, or Firm* — Buchanan Ingersoll & Rooney PC

(57) ABSTRACT

The present invention relates to the technical field of the human computer interaction, more particularly to, a system and method for human computer interaction. The system for human computer interaction comprises a projection unit, a first image sensing unit, a second image sensing unit, an interface unit, an image processing unit, a projected interface processing unit, and a controlling unit. The system for human computer interaction provided by the present invention may easily project the human computer interaction interface on all kinds of planes encountered in people's daily life, to realize display of the human computer interaction interface everywhere, and improve users' experience.

13 Claims, 6 Drawing Sheets

SYSTEM AND METHOD FOR HUMAN COMPUTER INTERACTION

TECHNICAL FIELD

The present invention relates to the technical field of human computer interaction, particularly to a system and method for human computer interaction.

BACKGROUND

One important aim for people is to work, have fun and amusement by using electrical devices such as computers, mobile phones etc. conveniently and comfortably in anywhere, that is omnipresent human computer interaction. However, the existing solution does not achieve good results, on the one hand, though the prior mobile phone has strong calculating and processing ability, the size of the phone is small, resulting in the display screen is too small to be suitable for watching, and the keyboard is too small to be operated conveniently by users, on the other hand, though the prior notebook may be portably carried, by comparing with the mobile phone, it still seems cumbersome and can't be carried conveniently, resulting from the size is much large and the weight is much heavy. If the notebook is designed smaller, the same situation as the phone that the notebook is not used conveniently will happen.

In addition, most of the prior electrical devices have an external operating and controlling panel, a display panel, and a keyboard or a mouse etc., which will actually have big influence on the reliability and stability of the devices, such as electrical devices on the vessels (which need strong resistance on salt, fog and humidity etc.,). Meanwhile, the size of the devices will become big because of the external operating and controlling panel, and the display panel.

For the prior portable or wearable human computer interaction system using projection, one typical manner is to constitute a human computer interaction system with a depth sensor, which is formed by using a projection-invisible optical projection unit with infrared structured light and an infrared image sensing unit, and a visible light projector etc. (some systems even include a visible light image sensing unit), however, the depth sensing unit (such as kinect of Microsoft) utilized by such system normally has big power consumption and volume, especially for an application of the smart phone, its size gets bigger because it needs adding infrared projection and infrared image sensing unit additionally in the phone. The other manner is to constitute a portable human computer interaction system which is formed by one visible light projecting unit and one visible light image sensing unit, however, such system needs producing invisible structured light for obtaining the operation of touching the projecting plane by fingers accurately, and the principle of method for producing the invisible structured light is generally to require projecting frequency of the projecting unit bigger than 75 Hz, normally 120 Hz, as well as frame rate for image collecting of the image sensing unit is same as frame rate for projecting, therefore the power consumption of such system would be excessive too because the frame rate for projecting and image collecting is very high. In addition, the computation complexity of such system will be enhanced resulting from that the invisible structured light still has coding and decoding.

In summary, the prior electrical devices have the following defects, (1) size of the operating and controlling panel or the display panel is too small to be suitable for watching and operating, (2) the volume and weight of the electrical devices with the operating and controlling panel or the display panel is too big to be portably carried, (3) reliability and stability of the electrical devices with the operating and controlling panel or the display panel is too weak to work under some special severe environments, and (4) both power consumption and size of the prior portable or wearable human computer interaction system with projection is too high and big.

SUMMARY OF THE INVENTION

Technical Problem to be Solved

The technical problem to be solved by the present invention is how to provide a system for human computer interaction which is miniaturized and constituted based on double image sensing units and a projecting unit, and its method, to achieve that a human computer interaction electrical device is used conveniently and comfortably in anywhere, so that such electrical device can work in some special severe environments.

Technical Solution

In order to solve the above mentioned problem, a system for human computer interaction is provided, which comprises a projecting unit, a first image sensing unit, a second image sensing unit, an interface unit, an image processing unit, a projected interface processing unit, and a controlling unit, in which, the projecting unit is for receiving human computer interaction interface information data output by the interface unit, and projecting and outputting the data to a projecting plane;

the first image sensing unit and the second image sensing unit is for collecting projected image information on an area of the projecting plane, and outputting to the image processing unit through the interface unit;

the interface unit is coupled to the projecting unit, the first image sensing unit, the second image sensing unit, the image processing unit, the projected interface processing unit and the controlling unit is for synchronous controlling the first image sensing unit, the second image sensing unit and the projecting unit;

the image processing unit is for receiving image data collected by the first image sensing unit and the second image sensing unit; receiving a human computer interaction interface image output by the projected interface processing unit, and extracting feature information in the human computer interaction interface image; calculating and obtaining system inherent internal parameters which comprise aberration distortion parameters, focus, pixel size and center point position on optical lens of the first image sensing unit, the second image sensing unit and the projecting unit, storing the system inherent internal parameters on a non-volatile memory, and outputting the system inherent internal parameters to the interface unit; extracting corresponding feature information for the image data, and matching it with the feature information output by the projected interface processing unit; calculating and obtaining system inherent external parameters which comprise position and gesture relationship among the first image sensing unit, the second image sensing unit and the projecting unit; and calculating and obtaining system variable external parameters which comprise position and gesture relationship between the human computer interaction system and the projecting plane, and outputting position and gesture relationship parameters between the projecting plane and the projecting unit in the obtained system variable external parameters to the projected interface processing unit;

the image processing unit is further for processing images of a projection area, which is collected by the first image sensing unit and the second image sensing unit, obtained through the interface unit, searching a fingertip or other touch element according to a predetermined fingertip feature, and obtaining a distance between the fingertip or other touch element and the projecting plane based on a principle of binocular disparity, if the distance is in the range of a predetermined first threshold value, determining a touch operation is occurred and outputting touch information;

the projected interface processing unit is for receiving human computer interaction information intended to be projected, extracting feature information from the human computer interface interaction information, and outputting the feature information to the image processing unit; the projected interface processing unit is further for receiving the position and gesture parameters between the projecting plane and the projecting unit in the system variable external parameters output by the image processing unit, performing shape predistortion correction processing to interface images in the input human computer interaction interface information based on the parameter and then outputting to the interface unit;

the controlling unit is for controlling all units of the system, and coordinately controlling work of all units of the system; the controlling unit is further for controlling the human computer interaction system in the statuses of obtaining the system inherent internal or external parameters, obtaining the system variable external parameters, and obtaining a fingertip and touch operation.

Preferred, the interface unit includes an image sensing interface module and a projecting interface module, wherein, the image sensing interface module is for receiving the system inherent internal parameters output by the image processing unit; receiving image data from the first image sensing unit and the second image sensing unit, and outputting to the image processing unit after performing optical distortion correction of the image data; the projecting interface module is for receiving the projected image data output by the projected interface processing unit, performing optical aberration predistortion correction processing of the projected interface images output by the projected interface processing unit based on the system inherent internal parameters, and outputting the corrected projected interface images to the projecting unit.

Preferred, the image processing unit includes a system inherent internal-external parameters obtaining module, a feature extracting module, a fingertip obtaining module, and a fingertip touch determining module, wherein, the system inherent internal-external parameters obtaining module is for receiving the system inherent internal or external parameters output by the feature extracting module, and storing the parameters in a non-volatile memory; outputting the system inherent internal parameters to the projecting interface module and the image sensing interface module; and outputting the system inherent internal or external parameters stored in the non-volatile memory to the feature extracting module;

the feature extracting module is for receiving feature information of human computer interaction interface output by the projected interface processing unit, under the state where the human computer interaction system is obtaining the system inherent internal-external parameters, and receiving images output by the image sensing interface module in accordance with the feature information, extracting the corresponding feature information of three from images of the projection area collected by the first image sensing unit and the second image sensing unit, performing matching of the feature information, calculating and obtaining the system inherent internal-external parameters, and outputting the system inherent internal-external parameters to the system inherent internal-external parameters obtaining module;

the feature extracting module is for receiving feature information of human computer interaction interface output by the projected interface processing unit, under the state where the human computer interaction system is obtaining the system variable external parameters, receiving images output by the image sensing interface module in accordance with the feature information, extracting the corresponding feature information of three from images of the projection area collected by the first image sensing unit and the second image sensing unit, performing matching of the feature information, calculating and obtaining the system variable external parameters, receiving the system inherent internal-external parameters output by the system inherent internal-external parameters module, respectively calculating and obtaining homography matrixes between the first image sensing unit and the projecting unit and between the second image sensing unit and the projecting unit, and outputting the matrixes to the fingertip touch determining module;

the fingertip obtaining module is for receiving image data output by the image sensing interface module, under the state where the human computer interaction system is obtaining a fingertip and touch operation, and processing the image data to obtain position coordinates information for the fingertip of the finger or front end of touch elements in image planes of the two image sensing units respectively, and outputting the position coordinates information to the fingertip touch determining module;

the fingertip touch determining module is for receiving the position coordinates information and the homography matrixes, under the state of obtaining a fingertip and touch operation; calculating a distance between the fingertip and the first image sensing unit and a distance between the fingertip and the second image sensing unit with the principle of binocular disparity, and, calculating and obtaining a distance between the projecting plane and the fingertip, or the front end of the other touch element, by means of position and gesture relationship between the first image sending unit and the projecting plane and between the second image sensing unit and the projecting plane;

preferred, if the distance between the projecting plane and the fingertip, or between the projecting plane and the front end of the other touch element is smaller than the predetermined first threshold value, then touch operation is determined; if the touch operation is occurred, the fingertip touch determining module is further for calculating and obtaining coordinates position of the touch points in the human computer interaction interface originally projected in accordance with the homography matrixes, and outputting the fingertip touch information.

Preferred, the projected interface processing unit includes an interface processing module and an interface inputting module;

wherein, the interface inputting module is for receiving human computer interaction interface information data input by the outside, and outputting to the interface processing module;

the interface processing module is for receiving the human computer interaction interface information data output by the interface inputting module, receiving the relative position and gesture parameters between the projecting plane and the projecting unit from the system variable external parameters, and performing image geometric predistortion processing on the human computer interaction interface images, and outputting it to the interface unit;

the interface processing module is further for extracting feature information of the human computer interaction interface from the input human computer interaction interface information, and outputting the feature information of the human computer interaction interface to the image processing unit.

Preferred, the system further comprises a feature deformation measuring module, wherein the controlling unit is for coordinating the human computer interaction system into the state of fingertip coarse positioning or fingertip fine positioning, if the human computer interaction system is in the state of finger coarse positioning, the controlling unit controls and selects anyone of the first image sensing unit and the second image sensing unit into a resting state, or stops all modules in the image processing unit processing images collected by the selected image sensing unit, or, selects the nearest one between the first image sensing unit and the second image sensing unit from the projecting unit into a resting state or stops all modules in the image processing unit processing images collected by the selected image sensing unit;

if the human computer interaction system is in the state of fingertip fine positioning, the controlling unit controls both the first image sensing unit and the second image sensing unit into a normal working state, or controls to start all modules in the image processing unit processing of images collected by the first image sensing unit and the second image sensing unit;

if the human computer interaction system is in the state of fingertip coarse positioning, the feature extracting module calculates and obtains the homography matrix between the projecting unit and the image sensing unit in the working state based on the system variable external parameters, receives the feature information of the human computer interaction interface output by the interface processing module, or receives human computer interaction interface image intended to be projected output by the projected interface processing unit, and extracts the feature information of the human computer interaction interface images through the feature extracting module; performs coordinate conversion to the feature information with the homography matrix, into a coordinate system of an image plane of the image sensing unit in the working state, and obtains corresponding feature information combined by a plurality of first basis feature units; obtains feature information combined by a plurality of second basis feature units in the human computer interaction interface on the projecting plane collected by the image sensing unit in the working state, the feature extracting module performs matching to the feature information combined by the plurality of first basis feature units and that combined by the plurality of second basis feature units in a coordinate system of an image plane of the image sensing unit or in a coordinate system of an image plane of the projecting unit, to obtain matchable basis feature unit pairs, and outputs the matchable result to the feature deformation measuring module;

the feature deformation measuring module receives matchable result of the feature information output by the feature extracting module, performs comparing to all matchable basis feature units, respectively calculates variation between the basis feature unit pairs, which at least includes shape variation or area variation between the basis feature unit pairs, or offset of the position coordinates of feature points; calculates a distance from the finger to the projecting plane at the point of deformation of the second basis feature unit based on the variation between the basis feature unit pairs, and evaluates the area for the finger present in the image plane of the first image sensing unit and the second image sensing unit, if the distance from the finger to the projecting plane at the point of deformation of the second basis feature unit is smaller than the predetermined first threshold value, touch operation is directly occurred; if the area of the touching area is too large, outputs coordinates of the possible touching area to the fingertip obtaining module to obtain accurate touching coordinates, otherwise, directly outputs coordinates of the corresponding touching area to the fingertip touch determining module, if the distance from the finger to the projecting plane at the point of deformation of the second basis feature unit is exceed the predetermined second threshold value, no processing is performed by following, if the calculated distance from the finger to the projecting plane at the point of deformation is between the first and the second threshold value, outputs the coordinates of the finger evaluated in the area in the image plane of the first image sensing unit and the second image sensing unit; wherein the predetermined first threshold value is smaller than the predetermined second threshold value;

the fingertip obtaining module is for receiving possible presenting area of the fingertip in the human computer interaction interface images, which are collected by the first image sensing unit and the second image sensing unit, output by the feature deformation measuring module, and respectively searching the fingertip only in the two corresponding area, then outputting two-dimensional coordinates of the fingertip respectively on the image planes collected by the first image sensing unit and the second image sensing unit to the fingertip touch determining module;

the fingertip touch determining module is further for receiving fingertip touch information, which includes accurate coordinates information of fingertip touch position and position information of fingertip touching area, output by the feature deformation measuring module;

when receiving touch operation output by the feature deformation measuring module and the accurate fingertip position coordinates of the image planes of the image sensing units output by the fingertip obtaining module, if the distance is smaller than the predetermined first threshold value, calculating and obtaining accurate position which the finger touched the human computer interaction interface originally projected in accordance with the homography matrixes between the projecting unit and the first image sensing unit and/or the second image sensing unit, and outputting the fingertip touch information.

Preferred, the projected interface processing unit receives graphics or image information of the human computer interaction interface input by the outside, or further receives feature information extracted from the human computer interaction interface, which includes types of the basis feature unit having points, lines, planes, letters or regular graphics, or images, and position information of the basis feature unit in the human computer interface images;

the interface processing module further directly extracts feature information data in the interface from the human computer interaction information;

the human computer interaction interface information of the interface inputting module further includes ranges of every clickable area in the human computer interaction interface;

the interface processing module further extracts the ranges of every clickable area in the human computer interaction interface and outputs it to the feature deformation measuring module;

the feature deformation measuring module further receives the ranges of every clickable area in the human computer interaction interface from the interface processing module, when the system is in the state of fingertip coarse positioning, determines whether evaluated position range of the finger of the coarse positioning is in the range in accordance with the ranges of every clickable area, if it is, then directly outputs touch information to the fingertip touch determining module; if not, then outputs evaluated position ranges of the finger of the coarse positioning to the fingertip obtaining module, and sends fingertip touch signals to the fingertip touch determining module.

Preferred, the interface processing module is further for producing images with different intensity or colors, to output them to the projecting interface module and the feature extracting module is for obtaining projecting color predistortion processing function; the interface processing module is further for receiving images with different intensity or colors from the outside of the system, to output them to the projecting interface module and the feature extracting module is for obtaining projecting color predistortion processing function; the interface processing module is for receiving projecting color predistortion processing function $f^{-1}$ or a lookup table output by the feature extracting module, the interface processing module is further for performing color aberration pre-correction processing to the input human computer interaction interface, to realize colors of the human computer interface projected on the projecting planes do not distort;

the feature extracting module is further for receiving images with different intensity or colors output from the interface processing module, further for receiving corresponding images with different intensity or colors collected by the first image sensing unit and the second image sensing unit, and performing the images comparing processing, to obtain difference analysis between images intended to be projected by the system and projected images of the projecting planes, to obtain optical modulation property of the projecting planes, and obtain projecting color predistortion processing function $f^{-1}$ or a lookup table in accordance with the optical modulation property, the feature extracting module outputs the obtained projecting color predistortion processing function $f^{-1}$ or the lookup table to the projecting interface processing module.

Preferred, the controlling unit is further for starting the feature extracting module to obtain the system variable external parameters at regular time, that is obtain the relative position and gesture information of the projecting plane relative to the system;

the feature extracting module is further for comparing the current obtained system variable external parameters to the earlier obtained system variable external parameters, if the current obtained system variable external parameters is different from the earlier obtained system variable external parameters, outputting the varied system variable external parameters to the interface processing module again, and further for calculating the homography matrix between the projecting unit, and the first and second image sensing unit, and outputting to the fingertip touch determining module.

A method for human computer interaction performed by the human computer interaction system is also provided by the present invention, it comprises:

S1, initially calibrating the human computer interaction system, to obtain system inherent internal and external parameters;

S2, obtaining system variable external parameters, and calculating homography matrixes respectively between the projecting unit, and the first and second image sensing unit based on the system variable external parameters and the system inherent external parameters;

S3, finely obtaining, by the fingertip obtaining module, position coordinates of a fingertip on planes of images collected by the first image sensing unit and the second image sensing unit and calculating a distance from the fingertip relative to a projecting plane, and searching the fingertip, by the feature extracting unit, from images received from and collected by the first image sensing unit and the second image sensing unit, and outputting the obtained position coordinates of the fingertip in the image planes of the first image sensing unit and the second image sensing unit to the fingertip touch determining module;

S4, calculating, by the fingertip touch determining module, a position relationship of the fingertip relative to the image sensing units, utilizing the principle of binocular disparity, in accordance with the received position coordinates of the fingertip respective in the planes of the first image sensing unit and the second image sensing unit, and calculating the relative position and gesture between the image sensing units and the projecting plane based on the system variable external parameters, and calculating and obtaining the distance of the fingertip from the projecting plane, if a distance between the fingertip and the projecting plane is smaller than a predetermined first threshold value, determining touch operation is occurred, and then turning to step S5; otherwise, returning to step S3;

S5, outputting touch information, and calculating and obtaining accurate position coordinates of the touching points in the coordinates system of the human computer interaction interface, in accordance with the coordinates of the touch points in the image planes of the first image sensing unit and/or the second image sensing unit combined with homography matrixes respectively between the projecting unit, and the first image sensing unit and/or the second image sensing unit, and then outputting them.

Preferred, the step S3 further comprises: S31, controlling, by the controlling unit, the human computer interaction system into the state of fingertip coarse positioning, selecting anyone image sensing unit into the state of resting from the first image sensing unit and the second image sensing unit, or stopping all modules of the image processing unit processing to the images collected by the selected image sensing unit; or selecting the nearest one distant from the first image sensing unit and the second image sensing unit to the projecting unit into the resting state, or stopping all modules of the image processing unit processing to images collected by the selected image sensing unit, to further obtain, by the feature extracting module, some basis feature unit pairs matched by a first basis feature unit and a second basis feature unit, to further calculate and obtain variation between the basis feature unit pairs utilizing the feature deformation measuring module, for performing rough determination of the possible area position that the fingertip presents in the collected images of the image sensing unit selected to work, which comprises:

If a distance from the finger at the points of the deformation of the second basis feature unit to a projecting plane is smaller than a predetermined first threshold value, determining a touch operation is occurred; if touching area is too large, then outputting coordinates of the touching area to the fingertip obtaining module, to obtain accurate touching coordinates; otherwise, directly outputting position coordinates of the corresponding touch area to the fingertip touch determining module, then turning to step S5;

If a distance from the finger at the points of the deformation of the second basis feature unit to a projecting plane is bigger than a predetermined second threshold value, determining a touch operation is not occurred, no process is performed by following, and returning to step S31;

If a distance from the finger at the points of the deformation of the second basis feature unit to a projecting plane is between a predetermined first and a second threshold value, outputting area coordinates of the fingertip evaluated in the image planes of the first image sensing unit and the second sensing unit to a fingertip obtaining module, then turning to step S32;

S32, finely searching a fingertip, in accordance with the coarse positioning area of the finger obtained by step S31, this step includes searching, by the fingertip obtaining module, the fingertip in the area of the finger coarse positioning in the images received from and collected by the first image sensing unit and the second image sensing unit, and outputting the position coordinates of the fingertip obtained in the image planes of the first image sensing unit and the second image sensing unit to the fingertip touch determining module, then turning to step S4.

Preferred, the step S2 further comprises scanning and obtaining a projecting color predistortion parameter of the projecting plane and performing color predistortion correction. Preferred, the step S2 further includes starting the feature extracting module to obtain system variable external parameters at regular time;

that is, obtaining relative position and gesture information of the projecting plane relative to the system, if the relative position and gesture is changed, re-calculating homography matrixes between the first image sensing unit and the second image sensing unit, and the projecting unit, and outputting again the changed system variable parameters to the interface processing module, which updates the system variable parameters, and performs the processing of projecting shape predistortion based on the changed system variable parameters, to realize tracking the projecting plane in real time.

Effect

A new system and method for human computer interaction, based on two image sensing units and one projecting unit, is provided by the present invention, it achieves the following beneficial effect:

1, accurately projecting the human computer interaction interface on all kinds of planes in people's daily life through the projecting unit, to achieve display of the human computer interaction interface in anywhere;

2, accurately obtaining the distance between the fingertip of the user and the projecting plane with the principle of binocular disparity, when the user is performing human computer interaction operation in the area without obvious feature in the human computer interaction interface;

3, further determining the possible area which the fingertip may present in the projected interface area, by utilizing that the basis feature unit in the interface will have deformation or the basis feature unit will have offset of the position coordinates in the images of the human computer interface when the users' hand is present in the area of the projected interface, if there is obvious feature information available in the projected human computer interaction interface; greatly narrowing the searching scope of the fingertip, lowering the computation complexity of the system, and improving real-time performance of the system, meanwhile, this procedure merely needs one image sensing unit and one projecting unit to be operated, to further lower the power consumption of the system;

4, the requirement for frame rate for collecting of two image sensing units is not high because projecting and collecting of invisible structured light is not needed, the frame rate for image collecting is to be guaranteed that an image is collected when the finger clicks on the interface every time, while the speed of clicking the interface by hands is very slow, for example, the rate that one single finger clicks on the interface over three times per second is very high;

5, the present invention can support the human computer interaction interface information input to the interface inputting module also includes feature information of the human computer interaction interface intended to be projected except the image of the human computer interaction interface, and firstly calculate the feature information utilizing the known interface to be projected, and the interface processing module do not need extracting feature information from the input human computer interface images, so that the computation complexity and power consumption of the interface processing module can be greatly lowered; additionally, the human computer interaction interface information input to the interface processing module further include a range of every possible clickable area, such as the range of area of a button, an icon, a menu etc., in the human computer interaction interface, therefore, when calculating these area where the fingertip touched, the position of the touch points in the human computer interaction interface is not needed to be accurately calculated, so that in practical applications, the coarse positioning of the fingertip can realize calculating of the position area of the touch points of the fingertip in many cases, thereby the computation complexity and power consumption can be saved;

6, sine the disclosed human computer interaction system can work without an operating and controlling panel and a display panel, its reliability and stability is greatly improved.

DETAILED DESCRIPTION OF THE INVENTION

The embodiments of the present invention will be detailed described accompanying with the embodiments and drawings. The exemplary embodiments are for illustrating the present invention, but not for limiting the scope of the present invention.

Embodiment 1

Figure 1:
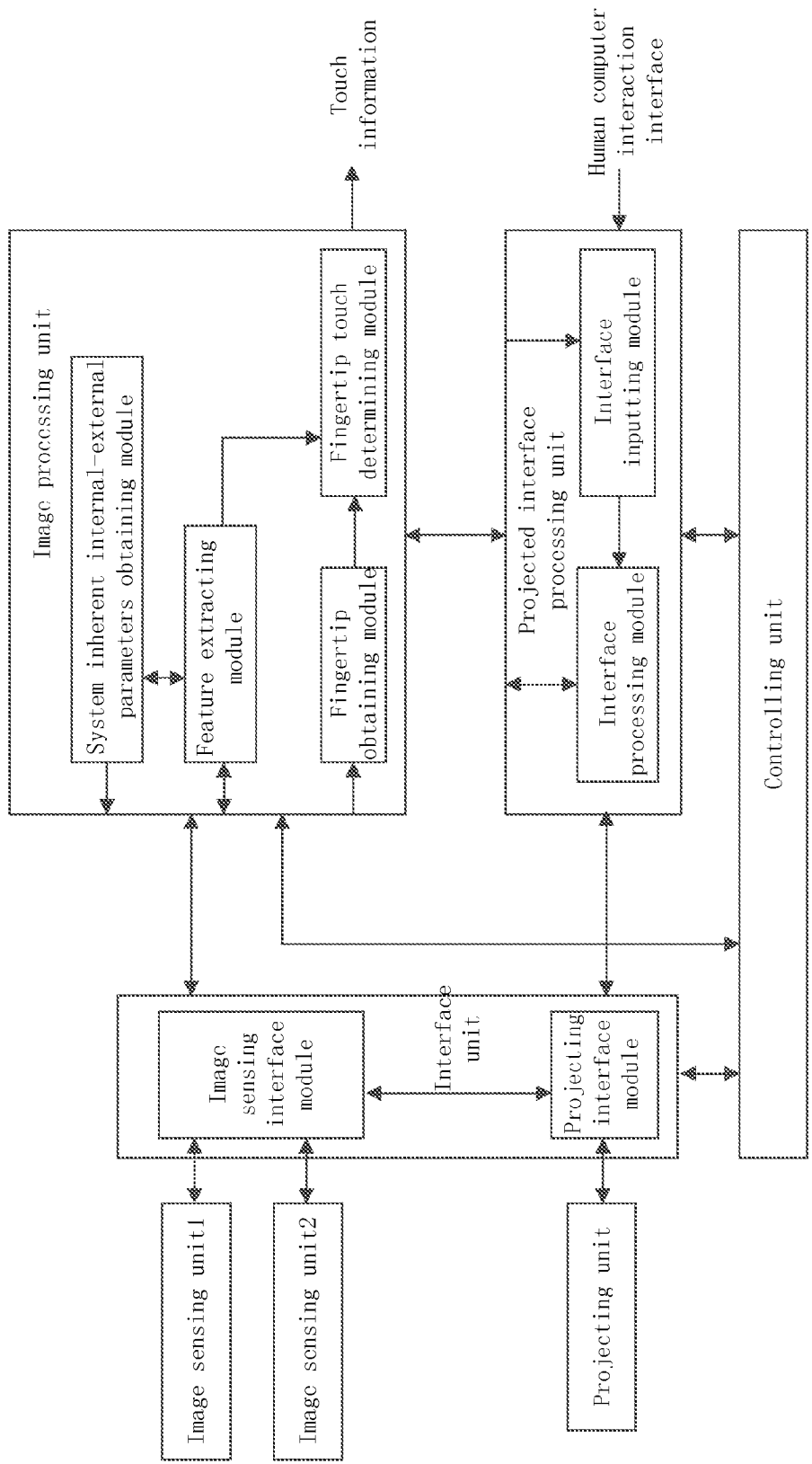
FIG. 1 is a structure schematic drawing illustrating a human computer interaction system according to an embodiment 1 of the present invention.

FIG. 1 is a structure schematic drawing illustrating a human computer interaction system according to an embodiment 1 of the invention; as shown in FIG. 1, the system for human computer interaction disclosed by the present invention comprises two image sensing units (the image sensing unit 1 (or the first image sensing unit) and the image sensing unit 2 (or the second image sensing unit)), one projecting unit, an interface unit, an image processing unit, a projected interface processing unit, and a controlling unit etc. The system receives human computer interface information through the projected interface processing unit, and performs processing to the interface information and after that, sends to the projecting unit for projecting on some normal planes such as desks, walls, paper, hand palms, arms etc., to accurately project and display the human computer interface, and then the user may perform bare hand operation similar to touching the screen on the projected human computer interface, while the two image sensing units collect the images on the projection area, identify the operation for human computer interaction, and output the corresponding information of the interaction operation, thereinto, the key point is to identify whether the hand touches the projected interface, and the position of the touch point on the projected human computer interface, here, a controlling unit coordinately controls work of all other units of the system.

The projecting unit is for projecting human computer interaction interface information data received from and output by the projecting interface module, and projecting and outputting to a projecting plane;

The image sensing unit 1 and the image sensing unit 2 are for collecting projecting image information on an area of the projecting plane, and outputting to the image processing unit through the interface unit;

The interface unit is coupled to the projecting unit, the image sensing units 1 and 2, the controlling unit, the projected interface processing unit and the image processing unit, for receiving system inherent internal parameters, (including optical distortion parameters of the image sensing unit 1, the image sensing unit 2 and the projecting unit), output by the image processing unit; the interface unit receives the image data from the image sensing units 1 and 2, and performs optical distortion correction, and after that, outputs to the image processing unit, as well as receives the projected image data output by the projected interface processing unit and performs optical distortion correction, and then outputs to the projecting unit; the interface unit mainly includes an image sensing interface module and a projecting interface module; the image sensing interface module is for receiving the optical distortion parameters of the image sensing units 1 and 2 from the system inherent internal parameters output by the image processing unit; the image sensing interface module is further for receiving image data from the image sensing unit 1 and the image sensing unit 2, and respectively performing optical distortion correction to images collected by the image sensing units 1 and 2, based on the optical distortion parameters of the image sensing units 1 and 2 in the system inherent internal parameters, to eliminate the optical aberration distortion brought by properties of the optical components of the image sensing units, and then outputting the corrected images to the image processing unit; the projecting interface module is for receiving projecting data from the projected interface processing unit, performing optical aberration predistortion correction processing of the images of the interface to be projected output by the projected interface processing unit based on the optical aberration parameters of the projecting unit in the system inherent internal parameters, to eliminate the optical aberration distortion brought by properties of the optical components of the projecting unit, and outputting the corrected image of the interface to be projected to the projecting unit. The interface unit is further for synchronous controlling the image sensing unit 1, the image sensing unit 2, and the projecting unit.

The image processing unit is for receiving image data of the image sensing unit 1 and the image sensing unit 2, output by the image sensing interface module, receiving and extracting the human computer interaction interface image output by the projected interface processing unit and feature information of the image (which at least includes types of a basis feature unit such as points, lines or other regular graphics or images etc., and further includes the position coordinates of the basis feature unit in the human computer interaction interface images); The image processing unit is for calculating and obtaining system inherent internal parameters (which comprise aberration distortion parameters, focus, pixel sizes and center point's position etc., on optical lens of the two image sensing units and the projecting unit), storing the system inherent internal parameters on a non-volatile memory, and outputting the system inherent internal parameters to the interface unit; The image processing unit is extracting corresponding feature information of the received image data, and matching it with the feature information output by the projected interface processing unit; calculating and obtaining position and gesture relationship among the image sensing unit 1, the image sensing unit 2 and the projecting unit (which is called system inherent external parameters) and position and gesture relationship between the human computer interaction system and the projecting plane (which is called system variable external parameter); The image processing unit is further for outputting the position and gesture relationship parameters between the projecting plane and the projecting unit in the obtained system variable external parameters to the projected interface processing unit; The image processing unit is further for processing the images, which are collected by the image sensing units 1 and 2, of the projection area, obtained through the interface unit, searching the fingertip (or other touch element) operated by the user based on fingertip feature, and obtaining the distance from the fingertip (or other touch element) to the projecting plane based on the principle of binocular disparity, if the distance is in the range of some one threshold value, determining the touch operation is occurred, and outputting the touch information, which at least includes the position coordinates of the touch points in the projected human computer interaction interface;

The projected interface processing unit is for receiving human computer interaction interface information intended to be projected, which at least includes human computer interaction Interface graphics or images intended to be projected, input from the outside; The projected interface processing unit is further for extracting obvious feature information from the input human computer interaction interface information, and outputting the feature information to the image processing unit; The projected interface processing unit is further for receiving relative position and gesture parameters between the projecting plane and the projecting unit in the system variable external parameters output by the image processing unit, and performing shape predistortion correction processing to interface images of the input human computer interaction interface information based on such parameter and then outputting to the interface unit;

The controlling unit is for controlling all units of the system, and coordinately controlling work of all units of the system; the controlling unit is further for controlling the human computer interaction system in the statuses of obtaining the system inherent internal or external parameters, obtaining the system variable external parameters, obtaining a fingertip and touch operation.

The projected interface processing unit further includes an interface processing module and an interface inputting module;

The interface inputting module is for receiving human computer interaction interface information data, (which may be compressed or uncompressed), input by the outside, decompressing the compressed human computer interaction interface information and outputting to the interface processing module; the interface inputting module may further include wireless interfaces, or wired interfaces.

The interface processing module is for receiving the human computer interaction interface information data output by the interface inputting module, and receiving the relative position and gesture parameters between the projecting plane and the projecting unit from the system variable external parameters output by the feature extracting module of the image processing unit; The interface processing module is further for performing geometric predistortion processing to the received human computer interaction interface, and outputting it to the interface unit; The interface processing module is further for extracting feature information of the human computer interaction interface from the input human computer interaction interface information, and outputting the feature information to the image processing unit;

The image processing unit includes a system inherent internal-external parameters obtaining module, a feature extracting module, a fingertip obtaining module, and a fingertip touch determining module, wherein, The system inherent internal-external parameters obtaining module is for receiving the system inherent internal or external parameters output by the feature extracting module, and storing the parameters in a non-volatile memory; The system inherent internal-external parameters obtaining module is for outputting the inherent internal parameters to the projecting interface module and the image sensing interface module of the interface unit; and outputting the inherent internal or external parameters stored in the non-volatile memory to the feature extracting module;

The feature extracting module is for receiving the human computer interaction interface feature information output by the projected interface processing unit, under the state of obtaining the system inherent internal-external parameters controlled by the controlling unit, in accordance with characteristic of the feature information, extracting the corresponding feature information of three from images of the projection area, which is collected by the image sensing unit 1 and the image sensing unit 2, output by the image sensing interface module, and performing matching of the feature information, calculating and obtaining the system inherent internal-external parameters, and outputting to the system inherent internal-external parameters obtaining module; The feature extracting module is for receiving the human computer interaction interface feature information output by the projected interface processing unit, under the state of obtaining the system variable external parameters controlled by the controlling unit, in accordance with characteristic of the feature information, extracting the corresponding feature information of three from images of the projection area, which is collected by the image sensing unit 1 and the image sensing unit 2, output by the image sensing interface module, and performing matching of the feature information, calculating and obtaining the system variable external parameters, that is the relative position and gesture between the projecting plane and the image sensing units 1 and 2, and between the projecting plane and the projecting unit; the feature extracting module is further for receiving the system inherent internal-external parameters output by the system inherent internal-external parameters obtaining module, calculating and obtaining homography matrixes (that is, conversion relationship of the coordinates between any points among two planes of the image sensing units and the plane of the projecting unit) between planes of the two image sensing units, (that is two imaging planes of the image sensor chips respectively,) and the plane of the projecting unit, (that is the plane of the projecting chip), combing with the obtained system variable external parameter and outputting the matrixes to the fingertip touch determining module;

The fingertip obtaining module is for receiving image data of the image sensing unit 1 or the image sensing unit 2 output by the image sensing interface module, and through processing the image data collected by the image sensing unit 1 and the image sensing unit 2, obtaining position coordinates information of the fingertip or front end of touch elements positioned in image planes of the two image sensing units respectively, and outputting the position coordinates information to the fingertip touch determining module;

The fingertip touch determining module is for receiving the position coordinates information of the fingertip or front end of touch elements positioned in image planes of the two image sensing units respectively output by the fingertip obtaining module; further for receiving the system variable parameters output by the feature extracting module; further for receiving the homography matrixes between two planes of the image sensing units and the plane of the projecting unit output by the feature extracting module, The fingertip touch determining module is calculating the distance between the finger and, the image sensing units 1 and 2 with the principle of binocular disparity, and calculating and obtaining the distance between the projecting plane and the fingertip, (or the front end of the other touch element), by using position and gesture relationship between the image sending units 1 and 2, and the projecting plane in the system variable external parameters; if the distance is smaller than one predetermined threshold value, then touch operation is determined as occurred; if the touch operation is occurred, the fingertip touch determining module is further for calculating and obtaining coordinates position of the touch points in the human computer interaction interface originally projected in accordance with the homography matrixes between the image sensing units 1 or 2 and the projecting unit received from the feature extracting module, and outputting the fingertip touch information, which at least includes the position coordinates information which the fingertip touched the human computer interaction interface originally projected; The manner that the fingertip touch determining module outputs the touch information may be wireless method or wired method.

Several key points of the system will be described by the following.

1, Obtaining System Inherent Internal-External Parameters

The system needs obtaining the inherent internal parameters and external parameters of the human computer interaction system constituted by two image sensing units and the projecting unit firstly before it leave the factory or is initially used. The system inherent internal parameters include internal parameters of the image sensing units and the projecting unit, which are mainly optical aberration parameters brought by properties of their respective optical components. The system inherent external parameters include the relative position and gesture relationship among three of the image sensing units 1 and 2, and the projecting unit. During the procedure of obtaining the system inherent internal-external parameters, the controlling unit controls the whole system in the state of obtaining inherent internal-external parameters, firstly controls two image sensing units to respectively obtain the internal parameters, in this embodiment, this procedure is performed by the feature extracting module and the system inherent internal external parameters obtaining module together, here the feature extracting module receives characteristic images intended to be calibrated (such as black and white or colorful chessboard images printed or pressed on a plane) of the standard image plate for calibration under different gestures and distances collected by the image sensing units, obtains feature corner from the collected images and its corresponding coordinates in the images, and outputs them to the system inherent internal-external parameters obtaining module, which calculates and obtains the internal parameters of the image sensing units intended to be calibrated, and stores them into the non-volatile memory of the module, the calculation principle and method is the prior art in the field, for example using ZhengYou Zhang's method, here the concrete principle will not be described again. The system inherent internal-external parameters obtaining module outputs the obtained internal parameters of two image sensing units to the image sensing interface module of the interface unit, and, the image sensing interface module performs correction to the optical aberration parameters of the images collected by the image sensing units 1 and 2, according to the inherent internal parameters, to eliminate the optical aberration distortion brought by the property of the optical components of the image sensing units 1 and 2, and outputs the corrected images to the image processing unit. After obtaining the internal parameters of the image sensing units 1 and 2, and then to obtain the internal parameters and the system inherent external parameters of the projecting unit, during the procedure of obtaining these parameters, the graphics or images (such as black and white or colorful chessboard) with obvious features are produced by the interface processing module or input by the outside of the system, additionally, the projecting plane is a standard image plate used in obtaining the system internal parameters of the image sensing units, or a blank flat. During the procedure of obtaining the parameters, the position and gesture of the projecting plane relative to the system is varied, the interface processing module of the projected interface processing unit is for obtaining feature information (which of the projecting images at least includes types of a basis feature unit, such as points, lines or other regular graphics or images, further includes the position coordinates of the basis feature unit in the projected human computer interface images) of the images intended to be projected, the feature extracting module of the image processing unit obtains feature information (feature information which collected by the image sensing units at least includes types of a basis feature unit, such as points, lines or other regular graphics or images, further includes the position coordinates of the basis feature unit in the images) of the images of the projection area collected by the image sensing units, these two kinds of feature information are sent to the feature extracting module of the image processing unit for performing the process of feature matching, and output to the system inherent internal-external parameters obtaining module, for calculating and obtaining the internal parameters and system inherent external parameters of the projecting unit, and storing them in the nonvolatile memory of such module. Since the steps of obtaining the system inherent internal and external parameters and obtaining feature, matching method, and calculating method are belong to the prior art in this filed, the detailed will not be described here. The internal parameters of the projecting unit obtained by the system inherent internal-external obtaining module are output to the projecting interface module, which performs predistortion correction to the interface image to be projected output by the projected interface processing unit based on such parameters, to eliminate the optical aberration distortion brought by the property of the optical components of the projecting unit, and outputs the corrected interface image to the projecting unit; the system inherent internal-external parameters obtaining module further outputs the calculated and obtained system inherent external parameters to the feature extracting module.

2, Obtaining the System Variable External Parameters

On the basis of the obtained system inherent internal and external parameters, the position and gesture relationship (that is the relative position and gesture between the projecting plane, and two image sensing units and the projecting unit) of the projecting plane relative to the human computer interaction system is needed to be known before the system performs a projecting operation every time, i.e. to obtain system variable parameters. The aim for obtaining such parameters is to realize the shape of the projected human computer interaction interface saw by users will not be changed on the projecting plane. The detailed procedure is similar to that of obtaining the system inherent external parameters, the controlling unit controls the whole system in the state of obtaining the system variable external parameters, the interface processing module of the projected interface processing unit produces graphics or images with obvious feature (such as black and white or colorful chessboard or structured light pattern) and outputs it to the projecting interface module, or the graphics or images with obvious feature is input from the outside of the system (that is, the graphics or images with obvious feature is input by the interface inputting module), the feature information of the images to be projected is obtained by the interface processing module of the projected interface processing unit, and output to the feature extracting module of the image processing unit, at same time, the feature extracting module per se obtains feature information of the images of the corresponding projection area collected respectively by the image sensing units 1 and 2, and then, the feature extracting module of the image processing unit performs the feature matching to the feature information of the images of such three units, and calculates and obtains the system variable external parameters (i.e. the relative position and gesture between the projecting plane, and two image sensing units and the projecting unit) the matching process and calculating method is belong to the prior art in the field, here no detailed will be described. The feature extracting module outputs the relative position and gesture etc. parameters between the projecting plane and the projecting unit of the system variable external parameters to the interface processing module of the projected interface processing unit, which performs shape predistortion correction based on the system variable external parameters, and outputs the result to the projecting interface module; the feature extracting module outputs the system inherent internal and external parameters and the system variable external parameters to the fingertip touch determining module, as well as calculates and obtains homography matrixes (that is, conversion relationship of the coordinates between any points in two planes of the image sensing units and the plane of the projecting unit) between two planes of the two image sensing units (i.e. two planes of the two image sensor chips) and the plane of the projecting unit (i.e. a plane of the projecting chip), by utilizing the system inherent internal and external parameters and the system variable external parameters, and outputs the homography matrixes to the fingertip touch determining module.

3, Obtaining System Touch Operation

In order to realize projecting the human computer interaction interface on the planes in daily life, and performing bare hand operation on the projecting plane similar to touch screen, one key point is to perform determining that bare hands touched the projecting plane accurately, this exemplary embodiment will perform determining of the touch operation with the principle of binocular disparity. After obtaining the system variable external parameters, that is obtaining the position and gesture relationship of the projecting plane relative to the human computer interaction system, the space position and gesture relationship of the projecting plane relative to the projecting unit and two image sensing unit is known, next step, the relationship between the hand and the projecting plane is obtained by merely obtaining the space position relationship of the hand relative to two image sensing units or the projecting unit, to determine whether the hand touched the projecting plane, and the touch position. During the procedure of obtaining the system touch operation according to this embodiment, the controlling unit controls the whole system in the state of obtaining the touch operation, the fingertip obtaining module of the image processing unit receives the images of the projection area collected by the image sensing units 1 and 2, respectively extracts the fingertip from such two images based on the characteristics of hands, obtains the position coordinates of the fingertip respective in the planes of two image sensing units, and outputs the result to the fingertip touch determining module, which receives the system inherent internal and external parameters output by the feature extracting module, and calculates the position relationship of the fingertip relative to two image sensing units with the principle of binocular disparity, and outputs the position relationship to the fingertip touch determining module, which calculates the distance of the fingertip relative to the projecting plane utilizing the position and gesture parameters of the two image sensing units relative to the projecting plane of the system variable external parameters, if the distance is in the range of one threshold value, the touch operation is determined. The position of the touch point in the projected interface is also needed to be calculated if the touch operation is occurred, preferred, the fingertip touch determining module calculates the position of the touch point in this embodiment, the fingertip touch determining module calculates the coordinates position of the touch point in the originally projected interface, by using the position coordinates (that is coordinates of the touch point in the image sensing unit) of the fingertip in the image sensing unit 1 or 2 output by the fingertip obtaining module, and the homography matrix (this is described in the procedure of obtaining the system variable external parameters above) between the image sensing unit 1 or 2 and the projecting unit obtained from the feature extracting module, finally the fingertip touch determining module outputs the touch operation and the position coordinates information of the corresponding touch point in the human computer interaction interface. Finally the fingertip touch determining module outputs the position coordinates of the touch point in the human computer interaction interface.

Embodiment 2

Considering in the embodiment 1, the procedure for searching the fingertip with the property of the fingertip in the whole projected human computer interaction interface and then determining the distance from the fingertip to the projecting plane is required, however, the whole procedure is complex and time consuming. Therefore, such embodiment will realize the coarse positioning of the finger by utilizing the structured light measuring system constituted by one projecting unit and one image sensing unit and the known obvious characteristics points, lines or other regular graphics or images etc., in the human computer interaction interface. The core idea is to realize the coarse positioning of the finger in the area of the projected interface by utilizing variation of the original feature information resulted from that there is a finger present or no finger present in the human computer interaction interface projected on the projecting plane, to narrow a searching area of the fingertip, and lower the complexity of the fingertip searching, even to directly determine touching based on the existing variation of the feature information, without searching the fingertip certainly, so that the complexity of the system may be lowered again.

After coarse positioning of the finger, it comes into the state of fine positioning of the fingertip, it is performed that searching the fingertip in the area of the coarse positioning of the finger by utilizing two image sensing units, and finely measuring the distance of the fingertip from the projecting plane with the principle of binocular disparity, the principle of the fine positioning of the fingertip is same as embodiment 1, here no detailed will be described.

Additionally, when the system performs the coarse positioning of the finger, the fingertip touch determining of next step may be not happened if the finger is too far from the projecting plane (for example the hand is suspended over the projected interface) during coarse positioning, and then the touch is not occurred, therefore, computational cost is saved. Another effect of the embodiment is that one image sensing unit and one projecting unit is merely needed working during coarse positioning of the finger, so that the power consumption for handling other one image sensing unit to collect images is saved.

During the state of coarse positioning of the finger, fine positioning of the finger will be occurred, for example, when the basis feature unit in the projected interface is projected on the finger and the fingertip or near the fingertip, the position of the fingertip may be obtained accurately with the principle of structured light measuring, if the fingertip has touched the projecting plane, the accurate touch determining of the finger may be given, and meanwhile the position touched may be accurately calculated, and the result of touch determining may be output to the fingertip touch determining module. Considering the touch position is not needed calculating accurately, for example if the finger clicks on a button with a large area, the results of touch determining and the area of the touched position may be directly given, and these results are output to the fingertip touch determining module when variation of the feature information is measured in a certain range.

Figure 2:
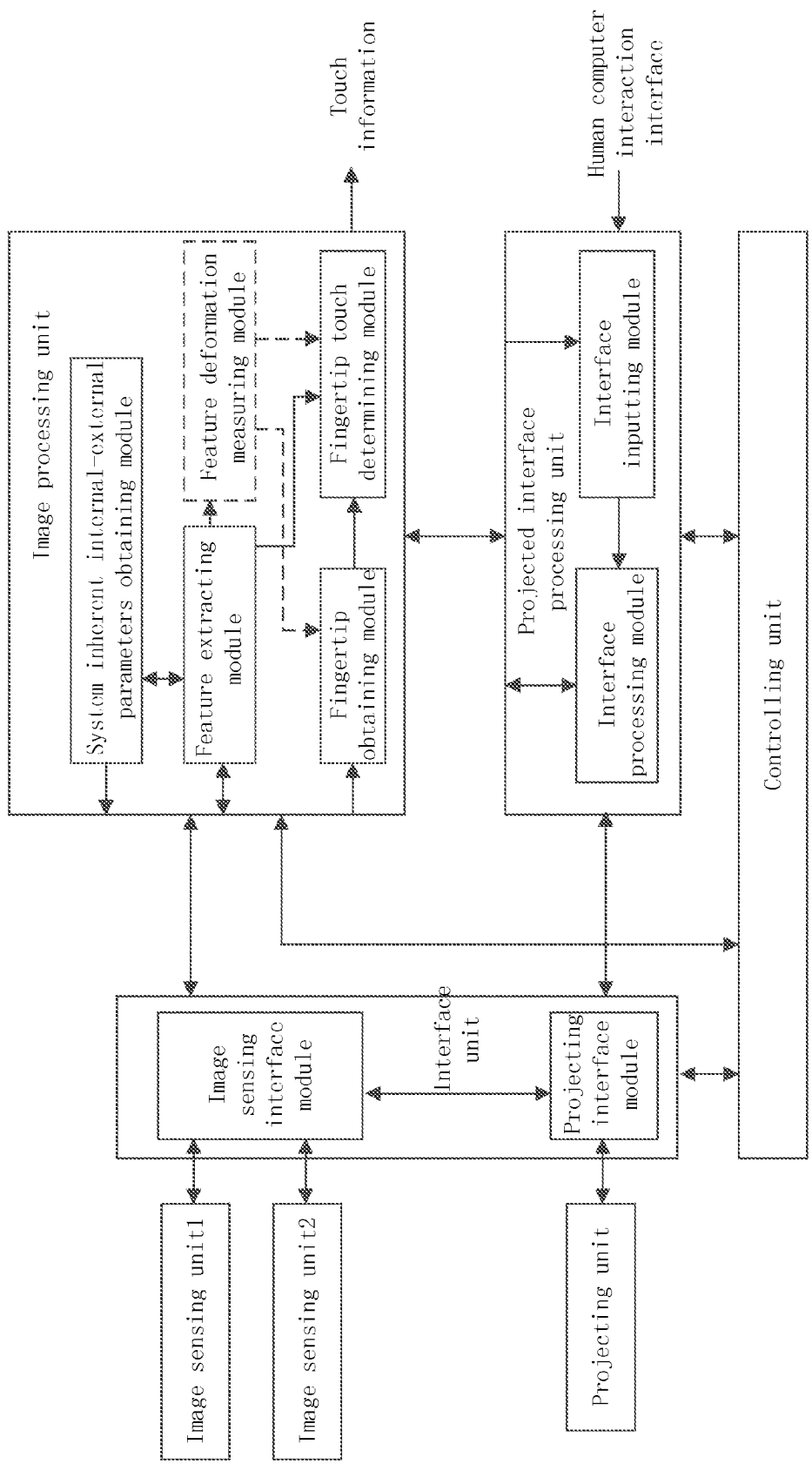
FIG. 2 is a structure schematic drawing illustrating a human computer interaction system according to an embodiment 2 of the present invention.

The structure of the human computer interaction system according to this embodiment is shown in FIG. 2

The controlling unit is for controlling and coordinating the whole system into the state of the fingertip coarse positioning and the fingertip fine positioning; if the system is in the state of fingertip coarse positioning, the controlling unit controls and selects anyone of the image sensing unit 1 and the image sensing unit 2 into a resting state or to stop processing of images collected by the selected image sensing unit, or, selects the nearest one between the image sensing unit 1 and 2 distant from the projecting unit into a resting state or to stop the feature extracting module processing images collected by the selected image sensing unit; if the system is in the state of fingertip fine positioning, the controlling unit controls the image sensing units 1 and 2 in the normal working state, or controls to start the feature extracting module to perform normal processing to the images collected by the image sensing units 1 and 2;

if the system is in the state of fingertip coarse positioning, the feature extracting module calculates and obtains the homography matrixes between the plane of the projecting unit and the planes of the image sensing units in the normal working state based on the system variable external parameters; receives the feature information 1 (which at least includes feature shape and the position coordinates of the basis feature unit) of the human computer interaction interface output by the interface processing unit, or, receives human computer interaction interface images intended to be projected output by the projected interface processing unit and extracts the feature information 1 of the images through the feature extracting module; and then performs coordinate conversion of the feature information 1 with the homography matrix, into a coordinate system of a plane of the image sensing unit in the normal working state, and obtains a new corresponding feature information 2; and obtains feature information 3 (which at least includes feature shape and position coordinates of the basis feature unit) of the human computer interaction Interface on the projecting plane collected by the image sensing unit under the state of normal working; the feature extracting module further performs matching to the feature information 2 and the feature information 3, and then outputs the matchable results (which at least include the matchable basis feature unit pairs, and the position coordinates of the matchable basis feature unit pairs respective in the planes of the image sensing units under the normal working state) to the feature deformation measuring module; of course the feature extracting module may also perform matching to the feature information in a coordinate system of the projecting unit, to obtain matchable basis feature unit pairs, and outputs the matchable result to the feature deformation measuring module;

The human computer interaction system further includes the feature deformation measuring module, which receives matchable result of feature information output by the feature extracting module, performs comparing to all matchable basis feature units, respectively calculates variation between the basis feature unit pairs, (the variation at least includes shape variation or area variation between the basis feature unit pairs, or offset of the position coordinates of feature points); The feature deformation measuring module further calculates a distance of the finger from the projecting plane at the point of feature deformation, and evaluates an area for the finger present in the image planes of the image sensing units 1 and 2 based on the variation between the basis feature unit pairs (that is the variation which is brought by the finger got involved in the human computer interaction interface), 1) if the distance from the finger to the projecting plane at the point of feature deformation is smaller than a smaller threshold value, touch operation is directly determined; if the area of the touching is too large (evaluates that the possible area touched by the finger exceeds a single clickable area of the interface), coordinates of the touching area is output to the fingertip obtaining module to obtain accurate touching coordinates, otherwise, coordinates of the corresponding touching area is directly output to the fingertip touch determining module, 2) if the distance from the finger to the projecting plane at the point of feature deformation exceeds a bigger threshold value, no processing is performed by following, 3) if the calculated distance from the finger to the projecting plane at the point of feature deformation is between the aforesaid two threshold values, the coordinates of the finger evaluated in the area in the image planes of the image sensing units 1 and 2 is output to the fingertip obtaining module;

The fingertip obtaining module is for receiving possible presenting area of the fingertip in the human computer interaction interface images, which are collected by the two image sensing units 1 and 2, output by the feature deformation measuring module, and searching the fingertip in the corresponding area, and then outputting two-dimensional coordinates of the fingertip on the image planes respectively collected by the image sensing units 1 and 2 to the fingertip touch determining module;

The fingertip touch determining module is further for receiving fingertip touch information, which includes accurate coordinates information of fingertip touch position and position information of fingertip touching area, output by the feature deformation measuring module; further calculating and obtaining accurate position of the fingertip which touched the human computer interaction interface originally projected in accordance with the homography matrixes between the two image sensing units or anyone of them, and the projecting unit when receiving touch operation output by the feature deformation measuring module and the accurate fingertip position coordinates of the fingertip in the planes of the image sensing units output by the fingertip obtaining module, and outputting the fingertip touch information, it should be understood that the two position coordinates with two different values may be obtained because the calculation of the accurate position coordinates uses the homography matrixes between two image sensing units and the projecting unit at the same time, therefore, the simplest method to obtain final position coordinates is to find the average of the two position coordinates values, to eliminate some error brought by the random noise.

This system is different from the embodiment 1 that the system may introduce a state of coarse positioning of the finger before fine positioning of the finger, the controlling unit controls the whole system into the state of obtaining touch operation, to perform coarse positioning of the finger with one image sensing unit and one projecting unit, that is to evaluate the possible area of the fingertip in the area of the projected interface, and then the controlling unit controls the whole system into the state of fine positioning of the fingertip, and starts processing on the images collected by the other one image sensing unit, searching the fingertip in the area obtained by coarse positioning of the finger, that is searching the fingertip in the appointed area of the images collected by two image sensing units, and determining fingertip touch and obtaining touch position with the principle of binocular disparity. After the system is in the state of fine positioning of the finger, the procedure is same as the embodiment 1. Here, coarse positioning of the finger will be mainly detailed described in the embodiment.

The controlling unit controls and coordinates the whole system respective into the states of coarse positioning of the finger and fine positioning of the fingertip. When the system is in the state of coarse positioning of the finger, concerning the measurement precision, the embodiment will prefer the further one of the image sensing units 1 and 2 with the relative distances between the image sensing units 1 and 2, and the projecting unit to work with the projecting unit together, in order to describe conveniently, this selected image sensing unit is called by the image sensing unit S, while there is no processing to the images collected by the other image sensing unit, or this image sensing unit may be suspended working into a resting state; When the system is in the state of coarse positioning of the finger, anyone of the image sensing units 1 and 2 may be selected to work with the projecting unit together, while there is no processing to the images output by the left image sensing unit which is not selected, or the left image sensing unit may be suspended working into a resting state to save power consumption. After finishing coarse positioning of the finger, the controlling unit may control the system into the state of fine positioning of the finger, and start normal working of the two image sensing units and perform normal processing on images of two way collected when determining operation of fine touch of the finger is still needed.

Figure 3:
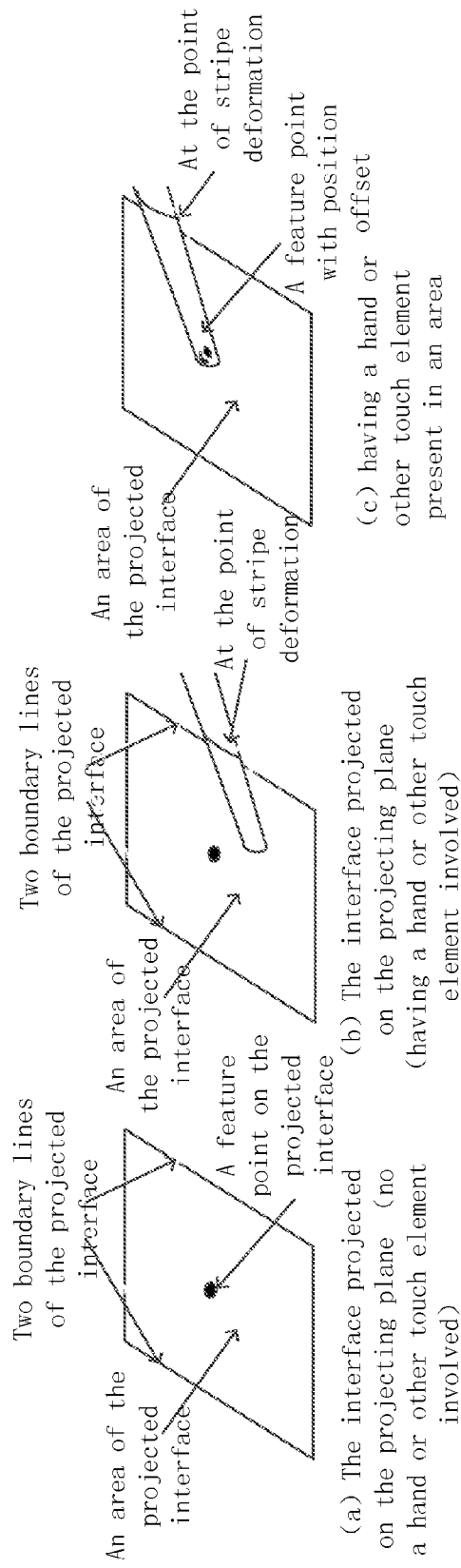
FIG. 3 is a schematic drawing illustrating a single window human computer interaction interface according to an embodiment of the present invention.
Figure 4:
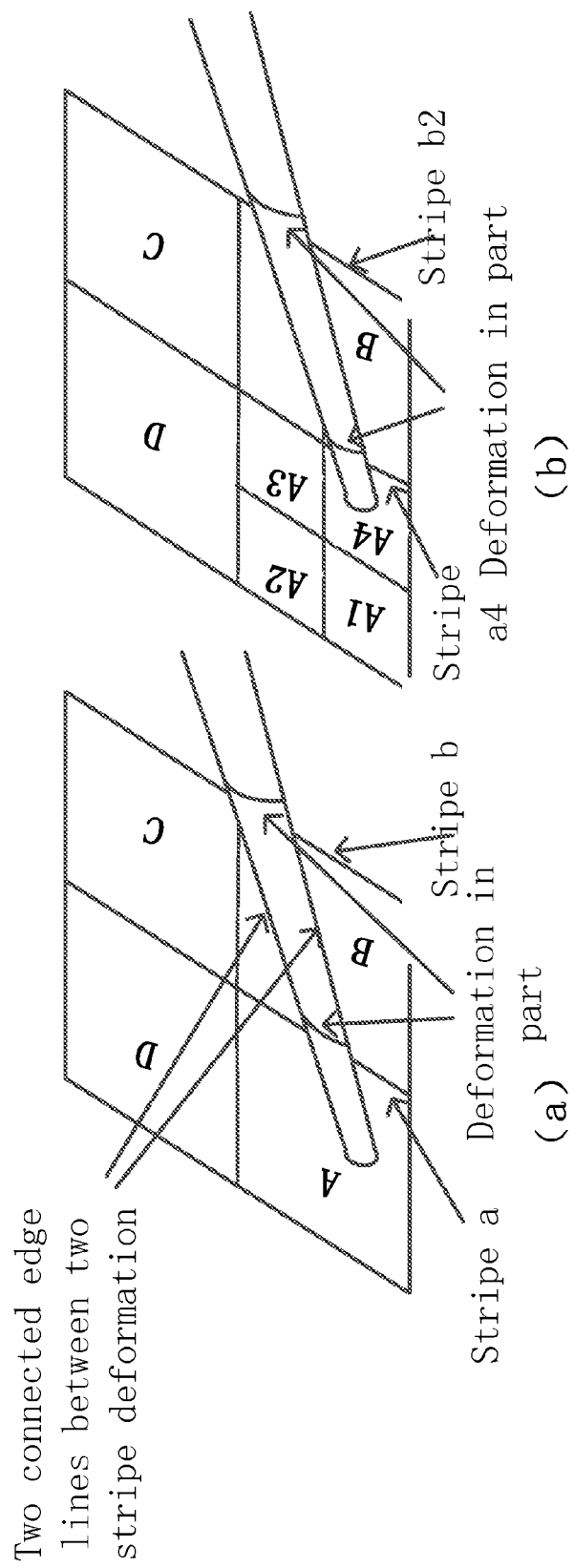
FIG. 4 is a schematic drawing illustrating a multiwindow human computer interaction interface according to an embodiment of the present invention.
Figure 5:
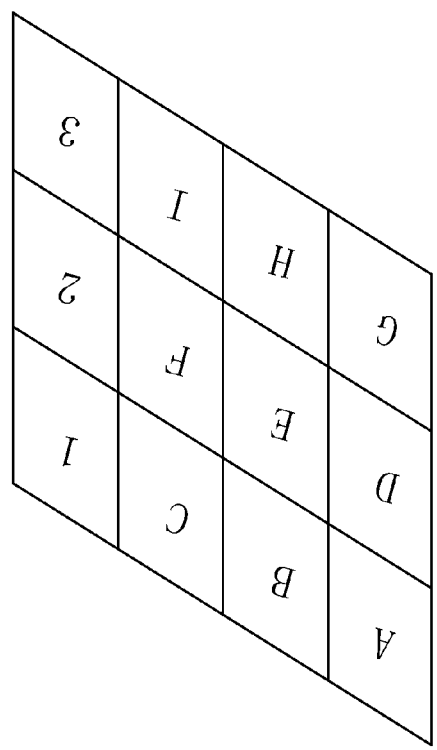
FIG. 5 is a schematic drawing illustrating a virtual keyboard according to an embodiment of the invention.
Figure 5:
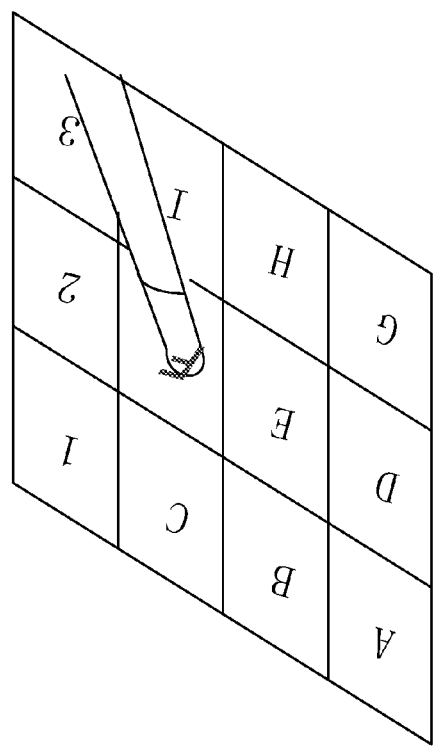

In order to obtain variation of the feature information of the human computer interaction interface on the projecting plane on which there is hand or no hand in the human computer interaction interface, firstly the feature information of the human computer interaction interface on the projecting plane without hands is to obtain, considering during the projecting there is possibility that hands may always be in the projection area of the human computer interaction interface, thereby it may not insure that the image sensing units may collect the images without hands, so that the embodiment will calculate the position coordinates and shape information, in the planes of the image sensing unit, of the feature information of the human computer interaction interface projected on the projecting plane without hands, by utilizing homography matrixes between the plane of the projecting unit and the planes of the image sensing units, (or calculate the images on the planes of the image sensing units mapped by the human computer interaction interface images to be projected with homography matrixes, and extract the feature information of the images by the feature extracting module). Therefore, the feature extracting module converts the feature information of the human computer interaction interface received from and output by the interface processing module (or receive the human computer interaction interface images to be projected output by the interface processing unit and extract the feature information of the images by the feature extracting module), into the planes of the image sensing unit S, in accordance with the obtained homography matrixes between the obtained plane of the projecting unit and the plane of the image sensing unit S (that is the corresponding coordinates conversion relationship between the plane of the projecting unit and the plane of the image sensing unit S) under the condition the projecting plane is not changed relative to the position and gesture of the system, that is, evaluate the feature shape and the position coordinates (for short, feature information projected and mapped in the image sensing) in the plane of the image sensing unit S corresponding to the feature information of the human computer interaction interface collected by the image sensing unit S, under the condition that during the current projecting plane, there is no hand present in the human computer interaction interface projected on the projecting plane; the feature extracting module further extracts feature information (including characteristic shape and position coordinates of the basis feature unit) of the images in the projection area collected by the image sensing unit S; and the feature extracting module further respectively matches the feature information projected and mapped in the image sensing to that of the images in the projection area collected by the image sensing unit S, and outputs the matchable result (which at least includes the matchable basis feature unit pairs and the position coordinates of the matchable basis feature unit pairs in the plane of the image sensing unit S) to the feature deformation measuring module;

The feature deformation measuring module receives the matchable result between the feature information projected to be mapped in the plane of the image sensing unit output by the feature extracting module and the feature information of the images of the projection area collected by the image sensing unit S, respectively calculates shape variation, area variation of their feature, or offset of the position coordinates of the feature points and so on for each pair of matchable basis feature units. If the distance of the finger at the point of feature deformation from the projecting plane is smaller than one smaller threshold value, touch operation is directly determined (the practical situation is at the time the basis feature unit is projected on the finger, and projected on the fingertip or near the fingertip), here, if a possible touch area of the finger is evaluated to exceed the range of a single clickable area of the interface of this area, then coordinates of the touch area is output to the fingertip obtaining module to obtain more accurate touch coordinates; if a possible touch area of the finger is evaluated to be in the range of a single clickable area of the interface of this area, then coordinates of the corresponding touch area is directly output to the fingertip touch determining module; if the distance of the finger at the point of feature deformation from the projecting plane is bigger than one bigger threshold value, (the practical situation is at the time the distance of the finger from the projecting plane is very far, i.e. the situation the fingertip touched the projecting plane may not happen with this distance), next process is not needed, to save unnecessary fingertip searching and touch operation; if the distance of the finger at the point of feature deformation from the projecting plane is between the aforesaid two threshold values, coordinates of the fingertip of the possible area evaluated in the image planes of the image sensing units 1 and 2 is output to the fingertip obtaining module. As shown in FIG. 3, FIG. 3 (a) illustrates the case where the human computer interaction interface is projected on the projecting plane, four obvious characteristic streak lines and one obvious characteristic point are included, FIG. 3 (b) illustrates the case where there is hands or touch element operated by the user on the projection area of the projecting plane, it is found that because the hand or other touch element presents, the basis feature unit on right-hand i.e. stripe on right-hand, performs stripe deformation in part, it is easily known that the deformation of stripe completely contains altitude information of the hand involved in the projection area at the deformed stripe from the projecting plane (calculating method of the altitude is belong to the prior art in this filed, here it will not be detailed described), therefore, according to the principle of the structured light measuring system constituted by one image sensing unit and one projecting unit, the feature deformation measuring module may calculate the altitude of the hand involved at the deformed stripe from the projecting plane through measuring this deformation value or offset, and determine whether the hand presents in the area of the projected interface based on the variation of the altitude information, for example, luminance and colors of the projection area of the projecting plane is clearly different from that of non-projection area, so four boundary lines may be formed. Four lines are shown in FIG. 3 (i.e. four outermost lines of the projected interface), whether there is hand or other touch element presenting in the projected human computer interaction interface may be determined through determining whether anyone of four lines deforms, if there is no deformation, the following finger searching or touch operation is not needed, to save power consumption; if the basis feature unit is projected on the fingertip or near the fingertip (the basis unit is still projected on the finger), as shown in FIG. 3 (c) the feature point is on the fingertip, here, the altitude of the fingertip from the projecting plane is accurately (the basis feature unit is on the fingertip) or substantially accurately (the basis feature unit is near the fingertip) measured with one projecting unit and one image sensing unit, if the altitude is belong to one of threshold values, the touch operation is directly determined, and the touch operation information is output to the fingertip touch determining module. Additionally, if there is too many basis feature units in the projected interface, as shown in FIG. 4, for example, the obvious boundary line may present between interface windows, where there is multiple interface windows in the projected human computer interaction interface, here, the basis feature units are stripes, the fingertip may be evaluated and forecasted to present in the area of the projected interface by determining the position of line deformation and its deformation variation when there is too many feature stripe present in the projected human computer interaction interface, as shown in FIG. 4 (a), since characteristic stripe a in the window A area is deformed in part, and the other four boundary lines are not deformed, the fingertip located in the area is determined area A, while two boundary lines a and b are deformed in the window B area, considering the case where there are multiple fingers touching the projected interface, firstly, it is determined whether deformation of the line b in part is smaller than one threshold value (that is determining whether the altitude of the finger at the deformed line from the projecting plane is smaller than one threshold value), if it is, then the finger is also determined to be present in the window B area, otherwise, it is determined whether deformation in part exceeds one threshold value (that is determining whether the altitude of the finger at the deformed line from the projecting plane exceeds one threshold value), here, there is no possibility the fingertip touched the projecting plane of the window B area, then whether the fingertip is in the area B is not concerned, to be simplified, under this situation, the result that there is no fingertip may be given. If the deformation in part is between the aforesaid two threshold values, then it is determined that whether the fingertips at the deformation in part of the two characteristic lines a and b have connected finger boundary, if having, it is determined that there is no fingertip in the window B area (as shown in FIG. 4 (a)), otherwise, there is fingertip in the window B area, finally, the range of the fingertip presenting area is output to the fingertip obtaining module, to finely search the fingertip. When there is more basis feature units distributed in the projected human computer interaction interface, as shown in FIG. 4 (b), the same determining procedure and method is performed to further narrow the fingertip searching scope to A4 area. When there are more basis feature units presenting in the human computer interaction interface projected on the projecting plane, that is the interval of the positions of the basis feature units is much smaller, as shown in FIG. 5, there are characteristic lines with small intervals in the interface, such as keyboard in the interface (here, it is merely determined which key-press area is touched by the finger, the precision of the touch position is not needed), here, since the interval between lines is relative small, during the touch operation between every two lines, the distance of the finger at the deformation from the projecting plane is measured with the principle of structured light, if the measured distance is smaller than one threshold value, it is directly determined whether there is fingertip touch, and the touched area of the fingertip (an area occupied by one key-press) is output, and the result is directly output to the fingertip touch determining module, therefore, the computation complexity of the system may be greatly lowered under this case. According to the above description, the feature deformation measuring module outputs the possible area of the fingertip in the images, collected by the two image sensing units, of the human computer interaction interface to the fingertip obtaining module under the state of coarse positioning of the finger; and further outputs fingertip touch information to the fingertip touch determining module, which includes accurate coordinates information of the position of the fingertip touch, and the position information of the area of the fingertip touch.

The fingertip obtaining module is for receiving possible presenting area of the fingertip in the human computer interaction interface images, which are collected by the two image sensing units, output by the feature deformation measuring module, and searching the fingertip in such area, then outputting two-dimensional coordinates of the fingertip respectively on the plane of the images collected by the image sensing units 1 and 2 to the fingertip touch determining module;

The fingertip touch determining module is further for receiving fingertip touch information, which includes accurate coordinates information of fingertip touch position and position information of fingertip touching area, output by the feature deformation measuring module; further calculating and obtaining accurate position of the fingertip which touched the human computer interaction interface originally projected in accordance with the homography matrixes between the planes of the image sensing units and the projecting unit when receiving fingertip touch operation output directly by the feature deformation measuring module and the accurate fingertip position coordinates of the fingertip in the planes of the image sensing units output by the fingertip obtaining module, and outputting the fingertip touch information.

Embodiment 3

Considering the different projecting planes will have different texture colors, the system may finish obtaining the projecting color predistortion parameters before projecting the human computer interaction interface. This embodiment is supplement on the basis of embodiments 1 and 2, here the consistent contents will not be described. The different parts, that is obtaining the projecting color predistortion parameters and color predistortion correcting, will be mainly described, the function of these two parts will only implemented in the feature extracting module and the interface processing module in this embodiment. Considering there are different colors and reflection properties on the different projecting planes, the system further needs scanning the colors and reflection properties of the projecting planes before the user performs projecting operation, that is the interface processing module of the projected interface processing unit produces images with different intensity and different colors (which may be the images with different intensity and colors input by the outside of the system and received through the interface inputting module), and sends to the projecting unit to be projected on the projecting plane, and meanwhile sends to the feature extracting module of the image processing unit, and then the image sensing units 1 and 2 collects the projected images on the corresponding projecting plane, the feature extracting module performs image comparison according to the images collected by the image sensing units and the projected images produced by the interface processing module (or images input by the outside), to obtain difference analysis between the images intended to be projected by the system and the projected images on the projecting plane, for obtaining optical modulation characteristics of the projecting plane, which is denoted as function f (or a look up table), so the projecting color predistortion processing function is $f^{-1}$ (or a look up table). The feature extracting module outputs the obtained projecting color predistortion processing function $f^{-1}$ (or a look up table) to the projecting interface processing unit, supposing the color of the images intended to be projected is Color, that is when the color of the human computer interface images received from the interface inputting module by the interface processing module is Color, the interface processing module performs preprocessing $f^{-1}$ (Color) to the images, the projected color of which is Color, according to the projecting color predistortion processing function, so that the image projected on the projecting plane is $f(f^{-1}(\text{Color}))=\text{Color}$, to realize projecting the human computer interaction interface with accurate colors.

Embodiment 4

This embodiment 4 is different from embodiments 1, 2 and 3 that the human computer interaction interface information input to the interface inputting module may include feature information of the human computer interaction interface to be projected which includes basis feature unit types (at least includes points, lines, geometrical shape and so on), and the position coordinates of the basis feature unit, except include images of the human computer interaction interface, for example the image to be projected is chessboard, so the human computer interaction interface information may include types of the basis feature unit (at least include points, lines, geometrical shapes and so on), and the position information of the feature corner of the chessboard (i.e. position coordinates information of the basis feature unit) and so on; for another example, the image to be projected is the keyboard as shown in FIG. 5, so the human computer interaction interface information may include the position coordinates information of every stripe in the projected interface. The benefits is calculating feature information in advance with the known interface to be projected, thereby the computation complexity of the interface processing module of the projected interface processing unit may be greatly lowered, and power cost brought by the feature extracting to the projected images etc., may also be lowered.

The human computer interaction interface information input to the interface inputting module further includes ranges of every clickable area in the human computer interaction interface, such as area of buttons, icons, menu etc.;

The interface processing module further extracts the ranges of every clickable area in the human computer interaction interface and outputs it to the feature deformation measuring module;

The feature deformation measuring module further receives the ranges of every clickable area in the human computer interaction interface from the interface processing module, when the system is in the state of fingertip coarse positioning, determines whether evaluated position range of the finger of the coarse positioning is in the range in accordance with the ranges of every clickable area, if it is, then directly outputs touch information to the fingertip touch determining module; if not, then outputs evaluated position ranges of the finger of the coarse positioning to the fingertip obtaining module, and sends fingertip touch signals to the fingertip touch determining module; The interface processing module further directly extracts feature information data of the interface from the human computer interaction information.

Embodiment 5

Considering the projecting plane is not fixed, there is rotation or translation of the projecting plane relative to the human computer interaction system, here, under the controlling of the controlling unit, the feature extracting module is started to obtain the system variable external parameters at regular time, that is to obtain the relative position and gesture information of the projecting plane relative to the human computer interaction system, when the relative position and gesture is found changed, the changed system variable external parameters is obtained again, and output such system variable external parameters to the interface processing module again, the interface processing module updates these parameters, and performs the projecting shape predistortion processing based on such new parameters, to realize tracking the projecting plane in real time.

It should be understood that all embodiments of the present invention have described the case where the hand touched the projecting plane, here, the other touch element can replace the hand, but the principle is same, so it will not be described detailed again.

Figure 6:
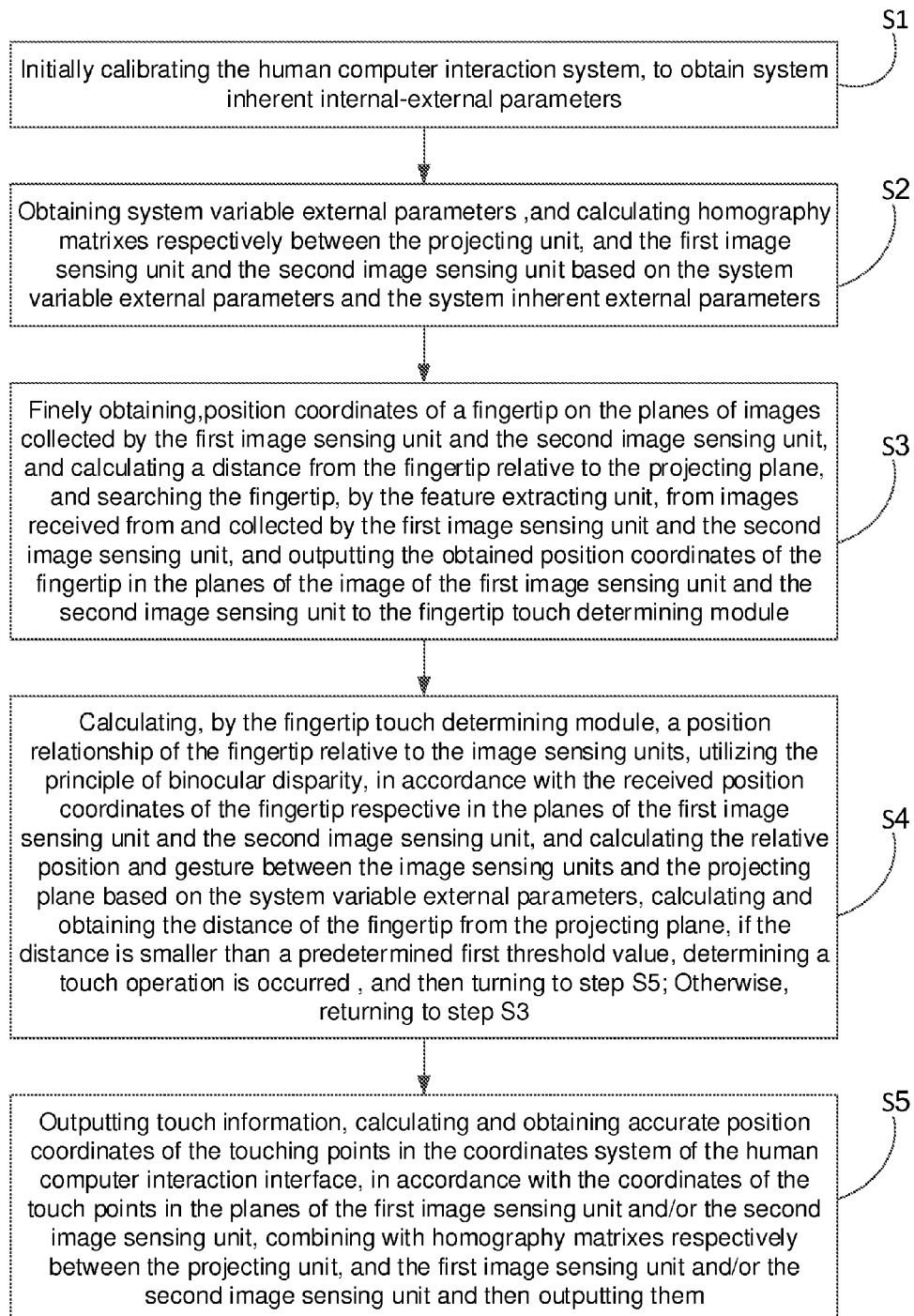
FIG. 6 is a flowchart illustrating a method for human computer interaction according to an embodiment of the present invention.

As shown in FIG. 6, it is a flowchart of the working method of the human computer interaction system, which comprises the steps of:

Step S1, initially calibrating the human computer interaction system, to obtain system inherent internal-external parameters, which include the internal parameters of the projecting unit, image sensing units 1 and 2, and the external parameters such as relative space position and gesture relationship among these three units; and storing the system inherent internal and external parameters in the nonvolatile memory of the system inherent internal-external parameters obtaining module;

Step S2, obtaining system variable external parameters, that is the relative space position and gesture relationship between the projecting plane and the human computer interaction system which includes the relative space position and gesture relationship respective between the image sensing units 1 and 2, the projecting unit and the projecting plane, and calculating homography matrixes respectively between the plane of the projecting unit, and the planes of the image sensing units 1 and 2 based on the system variable external parameters and the system inherent external parameters;

Step S3, finely obtaining, position coordinates of a fingertip on the planes of images collected by the image sensing units 1 and 2, and calculating a distance from the fingertip relative to the projecting plane, and searching the fingertip, by the feature extracting unit, from images received from and collected by the image sensing units 1 and 2, and outputting the obtained position coordinates of the fingertip in the two planes of the image sensing units 1 and 2 to the fingertip touch determining module;

Step S4, determining whether the touch operation is occurred: calculating, by the fingertip touch determining module, a position relationship of the fingertip relative to the image sensing units, utilizing the principle of binocular disparity, in accordance with the received position coordinates of the fingertip respective in the planes of the image sensing units 1 and 2, and calculating the relative position and gesture between the image sensing units and the projecting plane based on the system variable external parameters, finally calculating and obtaining the distance of the fingertip from the projecting plane, if the distance is smaller than a threshold value, determining a touch operating is occurred, and then turning to step S5; Otherwise, returning to step S3;

Step S5, outputting touch information: calculating and obtaining accurate position coordinates of the touching points in the coordinates system of the human computer interaction interface, in accordance with the coordinates of the touch points in the planes of the image sensing units, combining with homography matrixes respectively between the projecting unit, and the first image sensing unit and/or the second image sensing unit obtained by step S2, and then outputting them, and returning to step S3. It should be understood that if the accurate touch position coordinates is calculated with homography matrixes between the two image sensing units and the projecting unit at the same time, two position coordinates with a little different value may be obtained, the simplest method is to found the average of two position coordinates as final position coordinates to eliminate some error brought by the random noise.

Step S3 in the above mentioned method may further perform coarse positioning to the possible area of the fingertip, by utilizing the existing obvious feature information of the human computer interaction interface and structure light measuring system constituted by one image sensing unit and one projecting unit, and then finely search the fingertip in the images collected by the image sensing units 1 and 2 to further narrow the area of searching the fingertip.

The step S31: the step of coarse positioning of the fingertip. The controlling unit controls the human computer interaction system into the state of fingertip coarse positioning, selects anyone image sensing unit into the state of resting from the first image sensing unit and the second image sensing unit, or stops all modules of the image processing unit processing on the images collected by the selected image sensing unit; or selects the nearest one from the first image sensing unit and the second image sensing unit distant from the projecting unit into the resting state, or stops all modules of the image processing unit processing on the images collected by the selected image sensing unit, to further obtain, by the feature extracting module, some basis feature unit pairs matched by a first basis feature unit and a second basis feature unit, to further calculate and obtain variation between the basis feature unit pairs by utilizing the feature deformation measuring module, for performing a coarse positioning of the possible area that the fingertip presents in the images collected by the image sensing unit selected to work.

The interface processing module obtains obvious feature of the interface images from the input human computer interaction interface information, and converts the extracted feature information, (which is briefly called the feature information of the original interface), into the image plane of the image sensing unit with the homography matrixes between the plane of the projecting unit and the plane of the image sensing units, extracts the feature information (which is briefly called interface feature information of the projecting plane) from the collected images (which include the case where the finger of the user is operated in the projection area of the human computer interaction interface) of the human computer interaction interface collected by and projected on the projecting plane by utilizing the feature extracting unit, and outputs the feature information of the original interface and that of the interface of the projecting plane to the feature deformation measuring module, which compares variation of such two feature information (which at least includes shape variation, area variation or offset of the position coordinates of the feature points etc.,) for coarse positioning the position of the possible area of the finger present in the images collected by the image sensing unit, for different practical situations: 1, if the basis feature unit is projected on or near the fingertip (the basis feature unit is still projected on the finger), as shown in FIG. 3 (*c*) the feature point is on the fingertip, here, the distance of the finger from the projecting plane may be measured accurately (the basis feature unit is projected on the fingertip) or roughly accurately (the basis feature unit is projected near the fingertip) by utilizing one projecting unit and one image sensing unit, if the distance is in the range of one threshold value, the touch operation is directly determined, and the position information of the fingertip in the images is accurately calculated, then turning to step S5, otherwise, returning to step S31 to operate again; 2, when the human computer interaction interface projected on the projecting plane has dense basis feature units, that is the interval of the position of the basis feature units is much small, and the computation precision of the position of the touch points is not high, as shown in FIG. 5, there are feature stripes with small intervals in the interface, for example, the keyboard part of the interface, and here, it is only to be known which keystroke the finger touched, and the computation precision to the touch position is not needed accurate, when the fingertip performs touch operation between every two stripes, the distance of the fingertip from the projecting plane at the deformation are measured with the principle of structured light, if the distance is smaller than a threshold value, the fingertip touch operation is directly determined, and the area touched by the fingertip (which is in the range of area occupied by the keystroke, i.e. single clickable area) is merely obtained, and the touch operation and the position information of the area touched by the fingertip is output to the touch determining module, directly turning to step S5, otherwise returning to step S31, to start again, therefore, the computation complexity of the system may be greatly lowered in this situation; 3, if there are relative non-dense basis feature units in the projected interface, as shown in FIG. 4, for example, when there are multiple interface windows in the projected human computer interaction interface, the obvious boundary lines will be in the interface windows, the possible area where the fingertip presents may be evaluated through determining the variation of the basis feature units (i.e. the position and size of the stripes deformation) smaller than a threshold value, but determining whether the fingertip has performed touch operation may not be given, and, the procedure proceeds to step S32, if the variation of the basis feature unit is determined bigger than a threshold value, and the distance of the finger from the projecting plane is determined much far, so there is no possibility that touch operation is occurred, then returning to step 31 to restart;

Step S32: finely searching a fingertip, in accordance with the coarse positioning area of the finger obtained by step S31, this step includes searching, by the fingertip obtaining module, the fingertip in the appointed area in the images received from and collected by the image sensing units 1 and 2, and outputting the position coordinates of the fingertip obtained in the image planes of the two image sensing units to the fingertip touch determining module, then turning to step S4.

Considering different projecting planes have different texture colors, the system may further finish obtaining the projecting color predistortion parameters, before projecting the human computer interaction interface, Therefore, the step S2 further comprises scanning and obtaining a projecting color predistortion parameter of the projecting plane and performing color predistortion correction. Concerning the projecting plane is not fixed, the rotation or translation of the projecting plane relative to the human computer interaction system will appear, so that step S2 further comprises starting step S2 at regular time per se, that is the feature extracting module is started to obtain the system variable external parameters at regular time (that is to obtain the relative position and gesture information of the projecting plane relative to the system), when the relative position and gesture is found changed, the varied parameters are output to the interface processing module again, which updates these parameters, and performs projecting shape predistortion processing based on such new parameters, to realize tracking the projecting plane in real time.

Other aspects and character of the present invention is apparent to the skilled in this field by the description of the embodiments of the invention accompanying with the drawings.

The above mentioned is only the preferred embodiments of the present invention, it should be understood, the skilled in this technical field may further make amendment and replacement without beyond the scope of the technical principle of the invention, these amendment and replacement should be considered in the scope of the present invention.

What is claimed is:

1. A system for human computer interaction, wherein the system comprises: a projecting unit, a first image sensing unit, a second image sensing unit, an interface unit, an image processing unit, a projected interface processing unit, and a controlling unit, in which, the projecting unit is for receiving human computer interaction interface information data output by the interface unit, and projecting and outputting the data to a projecting plane;

the first image sensing unit and the second image sensing unit is for collecting projected image information on an area of the projecting plane, and outputting to the image processing unit through the interface unit;

the interface unit is coupled to the projecting unit, the first image sensing unit, the second image sensing unit, the image processing unit, the projected interface processing unit and the controlling unit, for synchronously controlling the first image sensing unit, the second image sensing unit and the projecting unit;

the image processing unit is for receiving image data collected by the first image sensing unit and the second image sensing unit; receiving a human computer interaction interface image output by the projected interface processing unit, and extracting feature information in the human computer interaction interface image; calculating and obtaining system inherent internal parameters which comprise aberration distortion parameters, focus, pixel size and center point position on an optical lens of the first image sensing unit, the second image sensing unit and the projecting unit; storing the system inherent internal parameters on a non-volatile memory, and outputting the system inherent internal parameters to the interface unit; extracting corresponding feature information for the image data, and matching it with the feature information output by the projected interface processing unit; calculating and obtaining system inherent external parameters which comprise position and gesture relationship among the first image sensing unit, the second image sensing unit and the projecting unit; and calculating and obtaining system variable external parameters which comprise position and gesture relationship between the human computer interaction system and the projecting plane, and outputting position and gesture relationship parameters between the projecting plane and the projecting unit in the obtained system variable external parameters to the projected interface processing unit;

the image processing unit is further for processing images of a projection area, which are collected by the first image sensing unit and the second image sensing unit, obtained through the interface unit; searching a fingertip or other touch element according to a predetermined fingertip feature, and obtaining a distance between the fingertip or other touch element and the projecting plane based on a principle of binocular disparity, if the distance is in the range of a predetermined first threshold value; determining a touch operation has occurred and outputting touch information;

the projected interface processing unit is for receiving human computer interaction information intended to be projected, extracting feature information from the human computer interface interaction information, and outputting the feature information to the image processing unit; the projected interface processing unit is further for receiving the position and gesture parameter between the projecting plane and the projecting unit in the system variable external parameters output by the image processing unit, performing shape predistortion correction processing to interface images in the input human computer interaction interface information based on the parameter and then outputting to the interface unit;

the controlling unit is for controlling all units of the system, and coordinately controlling work of all units of the system; the controlling unit is further for controlling the human computer interaction system in the statuses of obtaining the system inherent internal or external parameters, obtaining the system variable external parameters, and obtaining a fingertip and touch operation.

2. The system for human computer interaction of claim 1, wherein, the interface unit includes an image sensing interface module and a projecting interface module, wherein, the image sensing interface module is for receiving the system inherent internal parameters output by the image processing unit; receiving image data from the first image sensing unit and the second image sensing unit, and outputting to the image processing unit after performing optical distortion correction of the image data; the projecting interface module is for receiving the projected image data output by the projected interface processing unit, performing optical aberration predistortion correction processing of the projected interface images output by the projected interface processing unit based on the system inherent internal parameters, and outputting the corrected projected interface images to the projecting unit.

3. The system for human computer interaction of claim 2, wherein, the image processing unit includes a system inherent internal-external parameters obtaining module, a feature extracting module, a fingertip obtaining module, and a fingertip touch determining module, wherein, the system inherent internal-external parameters obtaining module is for receiving the system inherent internal or external parameters output by the feature extracting module, and storing the parameters in a non-volatile memory; outputting the system inherent internal parameters to the projecting interface module and the image sensing interface module; and outputting the system inherent internal or external parameters stored in the non-volatile memory to the feature extracting module;

the feature extracting module is for receiving feature information of human computer interaction interface output by the projected interface processing unit, under the state where the human computer interaction system is obtaining the system inherent internal-external parameters and receiving images output by the image sensing interface module in accordance with the feature information, extracting the corresponding feature information of three from images of the projection area collected by the first image sensing unit and the second image sensing unit, performing matching of the feature information, calculating and obtaining the system inherent internal-external parameters, and outputting the system inherent internal-external parameters to the system inherent internal-external parameters obtaining module;

the feature extracting module is for receiving feature information of human computer interaction interface output by the projected interface processing unit, under the state where the human computer interaction system is obtaining the system variable external parameters, receiving images output by the image sensing interface module in accordance with the feature information, extracting the corresponding feature information of three from images of the projection area collected by the first image sensing unit and the second image sensing unit, performing matching of the feature information, calculating and obtaining the system variable external parameters, receiving the system inherent internal-external parameters output by the system inherent internal-external parameters module, calculating and obtaining homography matrixes between the first image sensing unit and the projecting unit and between the second image sensing unit and the projecting unit, and outputting the matrixes to the fingertip touch determining module;

the fingertip obtaining module is for receiving image data output by the image sensing interface module, under the state where the human computer interaction system is obtaining a fingertip and touch operation, and processing the image data to obtain position coordinates information for the fingertip of the finger or front end of touch elements in image planes of the two image sensing units respectively, and outputting the position coordinates information to the fingertip touch determining module;

the fingertip touch determining module is for receiving the position coordinates information and the homography matrixes, under the state of obtaining a fingertip and touch operation; calculating a distance between the fingertip and the first image sensing unit and a distance between the fingertip and the second image sensing with the principle of binocular disparity, and, calculating and obtaining a distance between the projecting plane and the fingertip, or the front end of the other touch element, by means of position and gesture relationship between the first image sending unit and the projecting plane and between the second image sensing unit and the projecting plane.

4. The system for human computer interaction of claim 3, wherein, if the distance between the projecting plane and the fingertip, or between the projecting plane and the front end of the other touch element is smaller than the predetermined first threshold value, then touch operation is determined; if the touch operation is occurred, the fingertip touch determining module is further for calculating and obtaining coordinates position of the touch points in the human computer interaction interface originally projected in accordance with the homography matrixes, and outputting the fingertip touch information.

5. The system for human computer interaction of claim 2, wherein, the projected interface processing unit includes an interface processing module and an interface inputting module;

wherein, the interface inputting module is for receiving human computer interaction interface information data input by the outside, and outputting to the interface processing module;

the interface processing module is for receiving the human computer interaction interface information data output by the interface inputting module, receiving the relative position and gesture parameters between the projecting plane and the projecting unit from the system variable external parameters, and performing image geometric predistortion processing on the human computer interaction interface images, and outputting it to the interface unit;

the interface processing module is further for extracting feature information of the human computer interaction interface from the input human computer interaction interface information, and outputting the feature information of the human computer interaction interface to the image processing unit.

6. The system for human computer interaction of claim 5, further comprising a feature deformation measuring module, wherein the controlling unit is for coordinating the human computer interaction system into the state of fingertip coarse positioning or fingertip fine positioning, if the human computer interaction system is in the state of finger coarse positioning, the controlling unit controls and selects anyone of the first image sensing unit and the second image sensing unit into a resting state, or stops all modules in the image processing unit processing images collected by the selected image sensing unit, or, selects the nearest one between the first image sensing unit and the second image sensing unit distance from the projecting unit into a resting state or stops all modules in the image processing unit processing images collected by the selected image sensing unit;

if the human computer interaction system is in the state of fingertip fine positioning, the controlling unit controls both the first image sensing unit and the second image sensing unit into a normal working state, or controls to start processing of images collected by the first image sensing unit and the second image sensing unit, through all modules in the image processing unit;

if the human computer interaction system is in the state of fingertip coarse positioning, the feature extracting module calculates and obtains the homography matrix between the projecting unit and the image sensing unit in the working state based on the system variable external parameters, receives the feature information of the human computer interaction interface output by the interface processing module, or receives human computer interaction interface image intended to be projected output by the projected interface processing unit, and extracts the feature information of the human computer interaction interface images through the feature extracting module; performs coordinate conversion to the feature information with the homography matrix, into a coordinate system of an image plane of the image sensing unit in the working state, and obtains corresponding feature information combined by a plurality of first basis feature units; obtains feature information combined by a plurality of second basis feature units in the human computer interaction interface on the projecting plane collected by the image sensing unit in the working state, the feature extracting module performs matching to the feature information combined by the plurality of first basis feature units and that combined by the plurality of second basis feature units in a coordinate system of an image plane of the image sensing unit or in a coordinate system of an image plane of the projecting unit, to obtain matchable basis feature unit pairs, and outputs the matchable result to the feature deformation measuring module;

the feature deformation measuring module receives matchable result of the feature information output by the feature extracting module, performs comparing to all matchable basis feature units, respectively calculates variation between the basis feature unit pairs, which at least includes shape variation or area variation between the basis feature unit pairs, or offset of the position coordinates of feature points; calculates a distance from the finger to the projecting plane at the point of deformation of the second basis feature unit based on the variation between the basis feature unit pairs, and evaluates the area for the finger present in the image plane of the first image sensing unit and the second image sensing unit, if the distance from the finger to the projecting plane at the point of deformation of the second basis feature unit is smaller than the predetermined first threshold value, touch operation is directly occurred; if the area of the touching is too large, outputs coordinates of the possible touching area to the fingertip obtaining module to obtain accurate touching coordinates, otherwise, directly outputs coordinates of the corresponding touching area to the fingertip touch determining module, if the distance from the finger to the projecting plane at the point of deformation of the second basis feature unit exceeds the predetermined second threshold value, no processing is performed by following, if the calculated distance from the finger to the projecting plane at the point of deformation is between the first and the second threshold value, outputs the coordinates of the finger evaluated in the area in the image plane of the first image sensing unit and the second image sensing unit; wherein the predetermined first threshold value is smaller than the predetermined second threshold value;

the fingertip obtaining module is for receiving possible presenting area of the fingertip in the human computer interaction interface images, which are collected by the first image sensing unit and the second image sensing unit, output by the feature deformation measuring module, and respectively searching the fingertip only in the two corresponding area, then outputting two-dimensional coordinates of the fingertip respectively on the image planes collected by the first image sensing unit and the second image sensing unit to the fingertip touch determining module;

the fingertip touch determining module is further for receiving fingertip touch information, which includes accurate coordinates information of fingertip touch position and position information of fingertip touching area, output by the feature deformation measuring module;

further calculating a distance between the fingertip and the projecting plane with the principle of the binocular disparity when receiving touch operation output by the feature deformation measuring module and the accurate fingertip position coordinates of the image planes of the image sensing units output by the fingertip obtaining module, if the distance is smaller than the predetermined first threshold value, calculating and obtaining accurate position which the finger touched the human computer interaction interface originally projected in accordance with the homography matrixes between the projecting unit and the first image sensing unit and/or the second image sensing unit, and outputting the fingertip touch information.

7. The system for human computer interaction of 6, wherein
the projected interface processing unit receives graphics or image information of the human computer interaction interface input by the outside, or further receives feature information extracted from the human computer interaction interface, which includes types of the basis feature unit having points, lines, planes, letters or regular graphics, or images, and position information of the basis feature unit in the human computer interface images;

the interface processing module further directly extracts feature information data in the interface from the human computer interaction information;

the human computer interaction interface information of the interface inputting module further includes ranges of every clickable area in the human computer interaction interface;

the interface processing module further extracts the ranges of every clickable area in the human computer interaction interface and outputs it to the feature deformation measuring module;

the feature deformation measuring module further receives the ranges of every clickable area in the human computer interaction interface from the interface processing module, when the system is in the state of fingertip coarse positioning, determines whether evaluated position range of the finger of the coarse positioning is in the range in accordance with the ranges of every clickable area, if it is, then directly outputs touch information to the fingertip touch determining module; if not, then outputs evaluated position ranges of the finger of the coarse positioning to the fingertip obtaining module, and sends fingertip touch signals to the fingertip touch determining module.

8. The system for human computer interaction of claim 7, wherein
the interface processing module is further for producing images with different intensity or colors, to output them to the projecting interface module and the feature extracting module for obtaining projecting color predistortion processing function; the interface processing module is further receiving images with different intensity or colors from the outside of the system, to output them to the projecting interface module and the feature extracting module for obtaining projecting color predistortion processing function; the interface processing module is for receiving projecting color predistortion processing function $f^{-1}$ or a lookup table output by the feature extracting module, the interface processing module is further for performing color aberration pre-correction processing to the input human computer interaction interface, to realize colors of the human computer interface projected on the projecting planes do not distort;

the feature extracting module is further for receiving images with different intensity or colors output from the interface processing module, further for receiving corresponding images with different intensity or colors collected by the first image sensing unit and the second image sensing unit, and performing the images comparing processing, to obtain difference analysis between images intended to be projected by the system and projected images of the projecting planes, to obtain optical modulation property of the projecting planes, and obtain projecting color predistortion processing function $f^{-1}$ or a lookup table in accordance with the optical modulation property, the feature extracting module outputs the obtained projecting color predistortion processing function $f^{-1}$ or the lookup table to the projecting interface processing module.

9. The system for human computer interaction of claim 8, wherein
the controlling unit is further for starting the feature extracting module to obtain the system variable external parameters at regular time, that is obtain the relative position and gesture information of the projecting plane relative to the system;

the feature extracting module is further for comparing the current obtained system variable external parameters to the earlier obtained system variable external parameters, if the current obtained system variable external parameters is different from the earlier obtained system variable external parameters, outputting the varied system variable external parameters to the interface processing module again, and further for calculating the homography matrix between the projecting unit, and the first and second image sensing unit, and outputting to the fingertip touch determining module.

10. A method for human computer interaction performed by the human computer interaction system as claimed in claim 1, wherein the method comprises:

S1, initially calibrating the human computer interaction system, to obtain system inherent internal and external parameters;

S2, obtaining system variable external parameters, and calculating homography matrixes respectively between the projecting unit, and the first and second image sensing unit based on the system variable external parameters and the system inherent external parameters;

S3, finely obtaining, by a fingertip obtaining module, position coordinates of a fingertip on planes of images collected by the first image sensing unit and the second image sensing unit and calculating a distance from the fingertip relative to a projecting plane, and searching the fingertip, by the feature extracting unit, from images received from and collected by the first image sensing unit and the second image sensing unit, and outputting the obtained position coordinates of the fingertip in the image planes of the first image sensing unit and the second image sensing unit to the fingertip touch determining module;

S4, calculating, by a fingertip touch determining module, a position relationship of the fingertip relative to the image sensing units, by utilizing the principle of binocular disparity, in accordance with the received position coordinates of the fingertip respective in the planes of the first image sensing unit and the second image sensing unit, and calculating the relative position and gesture between the image sensing units and the projecting plane based on the system variable external parameters, and calculating and obtaining the distance of the fingertip from the projecting plane, if a distance between the fingertip and the projecting plane is smaller than a predetermined first threshold value, determining touch operation has occurred, and then turning to step S5; otherwise, returning to step S3;

S5, outputting touch information, and calculating and obtaining accurate position coordinates of the touching points in the coordinates system of the human computer interaction interface, in accordance with the coordinates of the touch points in the image planes of the first image sensing unit and/or the second image sensing unit combined with homography matrixes respectively between the projecting unit, and the first image sensing unit and/or the second image sensing unit, and then outputting them.

11. The method of claim 10, wherein the step S3 further comprises:

S31, controlling, by the controlling unit, the human computer interaction system into the state of fingertip coarse positioning, selecting anyone image sensing unit into the state of resting from the first image sensing unit and the second image sensing unit, or stopping all modules of the image processing unit processing to the images collected by the selected image sensing unit; or selecting the nearest one distant from the first image sensing unit and the second image sensing unit to the projecting unit into the resting state, or stopping all modules of the image processing unit processing to the images collected by the selected image sensing unit, to further obtain, by the feature extracting module, some basis feature unit pairs matched by a first basis feature unit and a second basis feature unit, to further calculate and obtain variation between the basis feature unit pairs utilizing the feature deformation measuring module, for performing rough determination of the possible area position that the fingertip presents in the collected images of the image sensing unit selected to work, which comprises:

If a distance from the finger at the points of the deformation of the second basis feature unit to a projecting plane is smaller than a predetermined first threshold value, determining a touch operation is occurred; if touching area is too large, then outputting coordinates of the touching area to the fingertip obtaining module, to obtain accurate touching coordinates; otherwise, directly outputting position coordinates of the corresponding touch area to the fingertip touch determining module, then turning to step S5;

If a distance from the finger at the points of the deformation of the second basis feature unit to a projecting plane is bigger than a predetermined second threshold value, determining a touch operation is not occurred, no process is performed by following, and returning to step S31;

If a distance from the finger at the points of the deformation of the second basis feature unit to a projecting plane is between a predetermined first and a second threshold value, outputting area coordinates of the fingertip evaluated in the image planes of the first image sensing unit and the second sensing unit to a fingertip obtaining module, then turning to step S32;

S32, finely searching a fingertip, in accordance with the coarse positioning area of the finger obtained by step S31, this step includes searching, by the fingertip obtaining module, the fingertip in the area of the finger coarse positioning in the images received from and collected by the first image sensing unit and the second image sensing unit, and outputting the position coordinates of the fingertip obtained in the image planes of the first image sensing unit and the second image sensing unit to the fingertip touch determining module, then turning to step S4.

12. The method of claim 10, wherein the step S2 further comprises scanning and obtaining a projecting color predistortion parameter of the projecting plane and performing color predistortion correction.

13. The method of claim 10, wherein
the step S2 further includes starting the feature extracting module to obtain system variable external parameters at regular time;
that is, obtaining relative position and gesture information of the projecting plane relative to the system, if the relative position and gesture is changed, re-calculating homography matrixes between the first image sensing unit and the second image sensing unit, and the projecting unit, and outputting again the changed system variable parameters to the interface processing module, which updates the system variable parameters, and performs the processing of projecting shape predistortion based on the changed system variable parameters, to realize tracking the projecting plane in real time.

* * * * *